US007947239B2

(12) United States Patent
Lackner et al.

(10) Patent No.: US 7,947,239 B2
(45) Date of Patent: May 24, 2011

(54) CARBON DIOXIDE CAPTURE AND MITIGATION OF CARBON DIOXIDE EMISSIONS

(75) Inventors: Klaus S. Lackner, Dobbs Ferry, NY (US); Patrick Grimes, Scotch Plains, NJ (US); Samuel C. Krevor, Brooklyn, NY (US); Frank S. Zeman, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 880 days.

(21) Appl. No.: 11/579,713

(22) PCT Filed: May 4, 2005

(86) PCT No.: PCT/US2005/015453

§ 371 (c)(1),
(2), (4) Date: Oct. 25, 2007

(87) PCT Pub. No.: WO2005/108297

PCT Pub. Date: Nov. 17, 2005

(65) Prior Publication Data

US 2008/0031801 A1 Feb. 7, 2008

Related U.S. Application Data

(60) Provisional application No. 60/568,091, filed on May 4, 2004.

(51) Int. Cl.
*B01D 53/62* (2006.01)
(52) U.S. Cl. ........ 423/220; 423/225; 423/234; 423/432; 204/516
(58) Field of Classification Search .................. 423/220, 423/225, 234, 432; 204/516
See application file for complete search history.

(56) References Cited

U.S. PATENT DOCUMENTS

| 3,880,981 | A | 4/1975 | Garingarao et al. | 423/150 |
|---|---|---|---|---|
| 4,140,602 | A | 2/1979 | Lewis et al. | 204/157 |
| 5,520,894 | A | 5/1996 | Heesink et al. | 423/230 |
| 5,792,440 | A | 8/1998 | Huege | 423/432 |
| 6,200,543 | B1 | 3/2001 | Allebach et al. | 423/220 |
| 2005/0002847 | A1* | 1/2005 | Maroto-Valer et al. | 423/432 |

OTHER PUBLICATIONS

International Preliminary Report (Application No. PCT/US2005/015453).
International Search Report and the Written Opinion (Application No. PCT/USO5/15453).
International Preliminary Report (Application No. PCT/US2005/015454).
International Search Report and the Written Opinion (Application No. PCT/USO5/15454).
Herzog, H. J., E. M. Drake, "Carbon Dioxide Recovery and Disposal From Large Energy Systems," Annu. Rev. Energy Environ., vol. 21: p. 145-166, 1996.
White, C. M., B. R. Strazisar, E. J. Granite, J. S. Hoffman, H. W. Pennline, "Separation and Capture of CO2 from Large Stationary Sources and Sequestration in Geological Formations-Coalbeds and Deep Saline Aquifers," Journal of the Air and Waste Management Association, vol. 55: p. 645-715, 2003.
Boynton, R. S., "Chemistry and Technology of Lime and Limestone," New York: Interscience Publishers, p. 204-206, 1966.
Zsako, J., M. Hints, "Use of Thermal Analysis in the Study of Sodium Carbonate Causticization by Means of Dolomitic Lime," Journal of Thermal Analysis, vol. 53: p. 323-331, 1998.
Astarita, G., "Mass Transfer with Chemical Reaction," Amsterdam: Elsevier Publishing Company, p. 144-152, 1967.
Desideri, U., A. Paolucci, "Performance Modelling of a Carbon Dioxide Removal System for Power Plants," Energy Conversion and Management, vol. 40: p. 1899-1915, 1999.
Olsson, J., A. Jernqvist, G. Aly, "Thermophysical Properties of Aqueous NaOH-H2O Solutions at High Concentrations," International Journal of Thermophysics, vol. 18(3): p. 779-793, 1997.
Konno, H., Y. Nanri, M. Kitamura, "Crystallization of Aragonite in the Causticizing Reaction," Powder Technology, vol. 123: p. 33-39, 2002.
Besra, L., D. K. Sengupta, S. K. Roy, "Particle Characteristics and Their Influence on Dewatering of Kaolin, Calcite and Quartz Suspensions," Int. J. Miner. Process., vol. 59: p. 89-122, 2000.
Singh, B. P., "Technical Note Ultrasonically Assisted Rapid Solid-Liquid Separation of Fine Clean Coal Particles," Minerals Engineering, vol. 12(4): p. 437-443, 1999.
Hanson, C., H. "Steam Drying and Fluidized-Bed Calcination of Lime Mud," Tappi Journal, vol. 76(11): p. 181-188, 1993.
Dillon, D. J., R. S. Panesar, R. A. Wall, R. J. Allam, V. White, J. Gibbins, M. R. Haines, "Oxy-Combustion Processes for CO2 Capture From Advanced Supercritical PF and NGCC Power Plant," Greenhouse Gas Control Technologies 7, Vancouver, Canada, 2004.
Keith, D. W., M. Ha-Duong, "CO2 Capture From the Air: Technology Assessment and Implications for Climate Policy," Greenhouse Gas Control Technologies 6, Kyoto, Japan: Pergamon, 2002.
Blok, K., R. H. Williams, R. E. Katofsky, C. A. Hendriks, "Hydrogen Production From Natural Gas, Sequestration of Recovered CO2 in Depleted Gas Wells and Enhanced Natural Gas Recovery," Energy, vol. 22(2/3): p. 161-168, 1997. Meier, A., E. Bonaldi, G. M. Cella, W. Lipinski, D. Wuillemin, R. Palumbo, "Design and Experimental Investigation of a Horizontal Rotary Reactor for the Solar Thermal Production of Lime," Energy, vol. 29: p. 811-821, 2004.

* cited by examiner

*Primary Examiner* — Stuart Hendrickson
(74) *Attorney, Agent, or Firm* — Wiggin and Dana LLP; Anthony P. Gangemi

(57) ABSTRACT

The present invention describes methods and systems for extracting, capturing, reducing, storing, sequestering, or disposing of carbon dioxide ($CO_2$), particularly from the air. The $CO_2$ extraction methods and systems involve the use of chemical processes, mineral sequestration, and solid and liquid sorbents. Methods are also described for extracting and/or capturing $CO_2$ via condensation on solid surfaces at low temperature.

22 Claims, 2 Drawing Sheets

CARBON DIOXIDE CAPTURE AND MITIGATION OF CARBON DIOXIDE EMISSIONS

This patent disclosure contains material that is subject to copyright protection. The copyright owner has no objection to the facsimile reproduction by anyone of the patent document or the patent disclosure, as it appears in the U.S. Patent and Trademark Office patent file or records, but otherwise reserves any and all copyright rights whatsoever.

All patents, patent applications and publications cited herein are hereby incorporated by reference in their entirety. The disclosures of these publications in their entireties are hereby incorporated by reference into this application in order to more fully describe the state of the art as known to those skilled therein as of the date of the invention described and claimed herein.

BACKGROUND OF THE INVENTION

The present invention relates generally to methods and apparatuses for capturing, sequestering, storing, disposing of, or entraining carbon dioxide (CO2), such as is found in the air and the environment, as well as for mitigating carbon dioxide emissions. In some aspects of the invention, the CO2 obtained by the methods and apparatuses is isolated and stored or disposed of to keep it from the air.

A serious environmental problem facing the world today is global climate change, i.e., global warming, which has been linked to the increased production of greenhouse gases, namely, carbon dioxide ($CO_2$). Growing evidence details the accumulation of greenhouse gases in the air, the most important of which is $CO_2$, as having an associated role in causing global climate warming. Since 2001, $CO_2$ accounted for over 82% of all greenhouse gas emissions in the United States. Nearly 60% of $CO_2$ is emitted by utility or industrial power systems, which are based on fossil fuel combustion. A continuing increase in the greenhouse gas $CO_2$ in the air highlights the need to develop cost effective, reliable and safe methods of $CO_2$ (or carbon) sequestration.

In order for carbon-rich fossil fuels, such as coal and natural gas, to remain viable and environmentally acceptable energy sources throughout the 21$^{st}$ century and beyond, new technologies that employ capture and sequestration, utilization, or recycling of $CO_2$ need to be developed at reasonable costs. The sequestration of $CO_2$ would allow the use of carbon-based fuels to meet the world's increased energy demands far into the future, without further increasing the atmospheric concentration of $CO_2$. Additionally, for fossil fuels to maintain their predominance in the global energy market, the disposal of $CO_2$ and the elimination of $CO_2$ emissions to the air are ultimate goals for curbing the problem of global warming.

The present invention addresses the pervasive problems of the release and presence of excessive amounts of $CO_2$ in the air and provides solutions to these problems in the form of methods and apparatuses for extracting, capturing and sequestering $CO_2$ and removing excess $CO_2$ from the air.

SUMMARY OF THE INVENTION

It is a general aspect of the present invention to provide new methods or processes for extracting, reducing, capturing, disposing of, sequestering, or storing $CO_2$ or removing excess $CO_2$ from the air, as well as new methods and processes for reducing, alleviating, or eliminating $CO_2$ in the air, and/or the emissions of $CO_2$ to the air. Another aspect of the invention relates to apparatuses, such as wind or air capture systems, to remove or extract $CO_2$ from air. As used herein, the term "air" refers to ambient air, rather than emitted gas, such as gas that is emitted from a smoke stack or an exhaust pipe. While the latter may contain air, it is not typically considered ambient air. In accordance with the present invention, extraction of $CO_2$ from air involves source gas, which is at atmospheric temperature, pressure and ambient concentration of $CO_2$.

In accordance with an aspect of this invention, a process involving acidic pH and elevated temperature for sequestering $CO_2$ as solid carbonate materials, e.g., magnesium carbonate, is provided. Suitable acids for this process are those that dissolve magnesium bearing silicates, such as serpentine, or olivine. The acidic solution formed contains dissolved magnesium salts, as well as some silica and dissolved iron salts. The acidic solution is neutralized to remove dissolved silica, and the dissolved iron salts are precipitated out as iron oxides and/or hydroxides. According to one aspect of the method, the magnesium salts in the solution are transformed into ammonium salts via precipitation of magnesium by the addition of ammonia-containing reagents, such as ammonium hydroxide, ammonium carbonate, or ammonium bicarbonate. Unless otherwise defined, the terms "method" and "process" are used interchangeably throughout this disclosure.

In an aspect of the present invention, a method of extracting or sequestering carbon dioxide is provided. The method comprises (a) dissolving a magnesium bearing silicate in an aqueous acid to form an acidic solution; (b) increasing the pH of the solution of step (a) to precipitate one or more magnesium components; and (c) carbonating the precipitated magnesium components from step (b) to bind carbon dioxide. In another aspect the invention provides a method of extracting or sequestering carbon dioxide, comprising: (a) dissolving a magnesium bearing silicate in an aqueous acid to form an acidic solution; (b) increasing the pH of the solution of step (a) to precipitate one or more magnesium components; (c) carbonating the precipitated magnesium components from step (b) to bind carbon dioxide; and (d) recovering ammonia gas and acid by thermal decomposition, e.g., heating, or by electrodialysis.

In another aspect, the present invention provides a method or process of extracting, sequestering, or capturing carbon dioxide. The process comprises (a) dissolving a magnesium bearing silicate in an aqueous acid to form an acidic solution; (b) neutralizing the acidic solution to remove partially-dissolved silica and produce a dissolved magnesium component; (c) precipitating a solid magnesium component from the neutralized solution with an ammonia containing reagent, thereby producing an ammonium salt in the solution; (d) precipitating the ammonium salt from the solution; and (e) carbonating the precipitated magnesium component to sequester or eliminate carbon dioxide, e.g., from the air. In addition, ammonia gas and acid (in liquid form) can be recovered in the method by thermal decomposition, e.g., heating, or by electrochemical methods.

In another aspect, the present invention provides a method of extracting, sequestering, reducing, or eliminating carbon dioxide involving (a) dissolving a magnesium bearing silicate in an aqueous acid to form an acidic solution; (b) neutralizing the acidic solution with a neutralizing agent to precipitate iron and silicate; (c) precipitating magnesium from the solution with a base, such as, for example, an ammonia-containing reagent; and (d) carbonating the precipitated magnesium component from step (c) to extract, sequester, reduce, or eliminate carbon dioxide. In addition, thermal decomposition or electrochemical processes can be used to recover ammonia and acid. As used herein, a base is a water-soluble compound, or aqueous solution comprised therefrom, that is capable of reacting with an acid to form a salt. Illustratively, such compounds comprise molecules, substances, or ions able to take up a proton from an acid, or able to give up an unshared electron pair to an acid. Basic solutions comprising the methods of the invention generally have a pH above about 7.

In another of its aspects, the present invention provides processes for extracting carbon dioxide from the air using solid or liquid sorbents that bind $CO_2$. Examples of solid sorbents include, without limitation, activated carbon, zeolites, or activated alumina. Examples of liquid sorbents include, without limitation, high pH solutions, such as sodium hydroxide solution, potassium hydroxide solution, or organic solvents, e.g., monoethanolamine (MEA), or SELEXOL®.

In another aspect, the present invention provides a method for extracting or capturing carbon dioxide from air using a solid absorber or sorbent material. The method involves (a) exposing a carbon dioxide absorber material comprising a large absorption surface to the air until the absorber material is saturated, or nearly saturated, with carbon dioxide; (b) removing remnant air from the saturated absorber material under vacuum or reduced pressure; (c) condensing the carbon dioxide on a cold surface to capture the carbon dioxide, e.g., in a solid form; and (d) releasing the captured carbon dioxide to a system for collection, storage, or transport. In accordance with this method, the solid sorbent material can comprise materials, objects, or substances, such as beads, rods, fabric, or moveable objects comprising rough surfaces, that move while exposed to air. In one aspect of the method, the carbon dioxide solid sorbent comprises a material that absorbs $CO_2$ throughout its entirety. Such a sorbent is preferably hydrophobic. Alternatively, the carbon dioxide sorbent comprises an inert material that is coated or covered with one or more $CO_2$ sorbents. Further in accordance with the method of this aspect of the invention, steps (b) and (c) can be performed in a first and second vacuum chamber, respectively, as described further herein. In addition, absorbed $CO_2$ can be released and captured in condensed form, i.e., dry ice, in a cold trap serving as the cold surface.

In a further aspect, the present invention provides a cryogenic carbon dioxide capturing or entrapping system comprising (a) a first chamber, or evacuation chamber, that houses carbon dioxide sorbent material, which is laden with carbon dioxide, for example, or on which carbon dioxide is captured; (b) a vacuum system which connects to the first chamber, partially reduces pressure therein and removes remnant air from the sorbent material; and (c) a second chamber which is connected to the first chamber and which has a temperature suitable for condensation and collection of carbon dioxide from the first chamber as solid carbon dioxide onto one or more surfaces in the second chamber. For example, the temperature of the second chamber can be about −80° C. or about −100° C. or lower. The second chamber can comprise a reduced partial pressure relative to the first chamber.

In another aspect, a method of sequestering $CO_2$ in ocean waters is described and involves the calcing of a material, such as limestone, dolomite, or carbonate to capture $CO_2$ from the air, for ultimate disposal in the ocean. According to this method, the alkalinity of the ocean surface is raised by the introduction (e.g., by injection) of metal oxide and/or metal hydroxide-containing materials such as, without limitation, $MgO/CaO$, $Mg(OH)_2/Ca(OH)_2$, $MgO/CaCO_3$, or $Mg(OH)_2/CaCO_3$. Such metal oxide materials are obtained by a calcination process and can lead to the additional capture of two moles of $CO_2$ for every mole of $CO_2$ entered into the system, as described herein. In this aspect, the $CO_2$ liberated in the calcination process plus the $CO_2$ resulting from the energy consumption of the calcination process is captured and disposed of. Accordingly, a method for removing carbon dioxide from air is provided, involving (a) calcining a metal carbonate—(e.g., calcium carbonate and/or magnesium carbonate) containing material to obtain one or more metal hydroxide calcination products; (b) introducing the calcination products of step (a) into a body of water so that the calcination products dissolve at or near the water surface; and (c) increasing the alkalinity of the water so as to capture at least two times the amount of carbon dioxide that is released by the calcining of step (a). After their production, the calcination products of step (b) can be finely dispersed into ocean or seawater from one or more vessels that drag behind or between them a line that drops a fine powder in the water, as described herein. Alternatively as described, the calcination products are fashioned into larger pellets that are dropped or ejected into the water. Such pellets can comprise $CaCO_3/MgO$ mixtures and disperse and dissolve at the water's surface.

In another of its aspects, the present invention provides a method of carbon capture that removes $CO_2$ from air. The method also advantageously serves to regenerate the sorbent employed in the method. The method involves the use of an alkaline liquid sorbent, e.g., sodium hydroxide (NaOH)-based, to remove $CO_2$ from ambient air and produce carbonate ions. The resultant sodium carbonate ($Na_2CO_3$) solution is mixed or reacted with calcium hydroxide ($Ca(OH)_2$) to produce sodium hydroxide and calcium carbonate ($CaCO_3$) in a causticizing reaction, which transfers the carbonate anion from the sodium to the calcium cation. The calcium carbonate precipitates as calcite, leaving behind a regenerated sodium hydroxide sorbent, thus regenerating the sorbent. The calcite precipitate is dried, washed and thermally decomposed to produce lime (CaO) and gaseous $CO_2$ in a calcination process. Thereafter, the lime is hydrated (slaked) to regenerate the calcium hydroxide sorbent. In a related aspect, this method can be implemented using air capturing systems, for example, towers or air or wind capture units of various design, which function as the physical sites where $CO_2$ is captured and removed from the air.

In another aspect, the present invention provides a method for extracting or capturing carbon dioxide from air, comprising: (a) exposing air containing carbon dioxide to a solution comprising a base, resulting in a basic solution which absorbs carbon dioxide and produces a carbonate solution; (b) causticizing the carbonate solution with a titanate-containing reagent; (c) increasing the temperature of the solution generated in step (b) to release carbon dioxide; and (d) hydrating solid components remaining from step (c) to regenerate the base comprising step (a).

In another aspect, the present invention provides a method for extracting or capturing carbon dioxide from air comprising: (a) exposing air containing carbon dioxide to a solution comprising a base, thus resulting in a basic solution which absorbs carbon dioxide and produces a carbonate solution; (b) causticizing the carbonate solution with a calcium hydroxide containing reagent; (c) calcining the resulting calcium carbonate under thermal conditions in which one or more mixed solid oxide membranes is interposed between the combustion gases and the input air; and (d) hydrating the product lime to regenerate the calcium hydroxide involved in step (b).

In yet another aspect the present invention provides systems and apparatuses for extracting, capturing, removing, or entraining $CO_2$ from the air. Such capture apparatuses can include wind and air capture systems or a cooling-type tower for extracting, capturing, removing, or entraining $CO_2$ as further described herein. Fan driven systems are also encompassed.

Additional aspects, features and advantages afforded by the present invention will be apparent from the detailed description, figures, and exemplification hereinbelow.

DESCRIPTION OF THE DRAWINGS

In FIGS. 2A and 2B, the thick black lines represent a solid structure as seen from above. As the air moves through the narrowed passage, the pressure drops (Venturi Effect). As a result the higher pressure air inside the enclosures that are open to the back of the flow have a tendency to stream into the low pressure air flow.

DETAILED DESCRIPTION OF THE INVENTION

The present invention generally relates to carbon dioxide ($CO_2$) extraction, reduction, capture, disposal, sequestration, or storage, particularly from the air, and involves new processes and apparatuses to reduce or eliminate $CO_2$, e.g., greenhouse gas $CO_2$, from the environment. Both air extraction and mineral sequestration of $CO_2$ are encompassed by the invention. The processes and systems described herein are aimed at effective and efficient carbon management, including cost effectiveness and efficient heat management resulting from the processes. Such processes and systems have been developed to extract or remove $CO_2$ from air, where, for example, the $CO_2$ concentration is approximately 0.037%. Thus, the processes and products of the invention provide useable and economically viable technologies for tackling and handling the escalating problem of global warming.

In one embodiment, the present invention encompasses a chemical process for extracting, reducing, or sequestering $CO_2$ by generating solid carbonate minerals, silica and water from basic rock materials and carbon dioxide. Advantageously, the process can eliminate the energy penalty that can result from other implementations of mineral sequestration. The $CO_2$ disposal process according to this invention combines an alkaline base, for example, in the form of magnesium oxide or hydroxide extracted from peridotite rock, with $CO_2$ to form stable magnesium carbonate. The overall chemical process is energy neutral and can achieve the consumption of only mineral rock and carbon dioxide.

The process according to this embodiment involves dissolving or digesting magnesium bearing silicate minerals (e.g., peridotite rock), such as serpentine, olivine, etc., at an acidic pH to extract magnesium ions. In acidic solution, magnesium dissolves, as do some of the silicate and various iron salts; other silicates can also precipitate out in acidic solution. Suitable acids for this process are those that dissolve peridotite rock, and can be strong or weak acids, as conventionally known in the art. Suitable acids have a pH in the range of about pH 4.5 to pH 5 or less, or molar concentrations in excess of 0.00001 moles per liter of hydrogen ions. Illustrative examples of acids for use in the process include, without limitation, hydrochloric acid, sulfuric acid, ammonium bisulfate, citric acid, chromic acid, phosphoric acid, acetic acid and combinations thereof. Also illustratively, a combination of weaker acids, e.g., orthophosphoric acid and oxalic acid, can be used. The acidic solution that is formed is separated from undissolved residues using a counterstream washing operation. For example, the residues are filtered from the acidic solution and the filtrate is rinsed with water to remove any acid that is entrained with the solids.

The pH of the acidic solution is increased using an alkaline reagent or base. For example the acidic solution is neutralized with an amount of base sufficient to raise the solution pH to about 7. As the pH of the solution is increased, silica and iron hydroxide are precipitated out as iron oxides and/or hydroxides, thus yielding a "brine" solution of a magnesium salt of the acid. After neutralization, the dissolved magnesium preferably remains in solution, although the pH of the solution is close to that at which the Mg salt precipitates, e.g., Mg precipitates in the form of magnesium hydroxide when the solution pH exceeds about pH 8. Some magnesium salts may be even less soluble. The neutralized solution, e.g., a clear brine, is then titrated with a basic solution, such as NaOH, KOH, $NH_3$, $NH_4OH$, or carbonates, as nonlimiting examples. The increase in solution pH results in the precipitation of the magnesium component, e.g., $Mg(OH)_2$. If, for example, the base used for titration is a hydroxide, e.g., NaOH, KOH, $NH_4OH$, the magnesium precipitate constitutes an $Mg(OH)_2$ product, which can be carbonated. Alternatively, if the base is a carbonate, for example, $(NH_4)_2CO_3$ or $Na_2CO_3$, then the precipitate is a carbonate, e.g., $MgCO_3$.

Prior to carbonation, the precipitated magnesium component product, e.g., an $Mg(OH)_2$ product, can be washed, e.g., using a counterstream operation, to remove the salt from the resulting filter cake. Following the precipitation of the magnesium component, e.g., $Mg(OH)_2$, a salt (e.g., NaCl) brine remains and is subsequently processed as described below. More generally, the salt mixture in this aspect is comprised of the cation introduced in the titration/precipitation step and the anion introduced in the above-described first step. The remaining salt preferably remains in solution, at least until the magnesium component, e.g., $Mg(OH)_2$, is removed. In one embodiment, the salt in solution is freed from any dissolved impurities by crystallizing or precipitating the impurities from the salt, which preferably stays in solution.

In a specific embodiment, a $Mg(OH)_2$ or $MgCO_3$ magnesium component is precipitated with a base comprising an ammonia-containing reagent. Illustratively, ammonia, ammonium hydroxide, ammonium carbonate, or ammonium bicarbonate can serve as ammonia-containing reagents for use in the process to precipitate a magnesium component, such as $Mg(OH)_2$ or $MgCO_3$; the negative ion (anion) from the magnesium salt is then transferred from the magnesium to the ammonium ion creating ammonium salts, e.g., ammonium sulfate, via precipitation by the addition of the ammonia base reagent to increase or raise the pH of the acidic solution.

In one embodiment involving the use of an ammonia reagent, a step of the process involves increasing the temperature, e.g., by heating, of the ammonium salt to recover the ammonia and the acid. The temperature of heating depends upon the ammonium salt used. In general principle, the ammonia salt is heated to relinquish the ammonia gas, leaving behind an acid or anhydride of an acid. For example, to transform a mixture of ammonium sulfate and water into ammonium bisulfate and ammonia, the mixture is heated to about 350° C. Heating serves to carbonate solid magnesium hydroxide or magnesium carbonate with gaseous carbon dioxide. Thus, for example, in one embodiment, the ammonium salt can be precipitated from the solution by reducing the volume of water. The reduction in water volume can occur by evaporation, membrane separation, and the like. In another embodiment, the ammonium salt can be precipitated from the solution by changing the temperature. For example, lowering the solution temperature causes the solubility product to be exceeded. This results in the precipitation of the salt. Lowering of the temperature can be achieved by allowing the solution to reach room temperature, or by other means known to those skilled in the art. The precipitated or solid ammonium salt is then heated to a temperature sufficient to dissociate the particular salt, for example, about 100° C. or greater. This releases free ammonia. Thus, having lost its base, the ammonium salt reverts to an acid and comprises an acid that is solid in an anhydrous form, e.g., ammonium bisulfate. The acid and ammonia can be recovered, e.g., by combination with a gas/solid carbonation cycle as described below, or by absorption into water, and the magnesium silicate is converted to silica and magnesium hydroxide.

Another embodiment of the process involves carbonating the precipitated magnesium component. Carbonation can occur by bringing together solid magnesium hydroxide with gaseous carbon dioxide. The two materials react to form magnesium carbonate and steam in an exothermic reaction, which can proceed at elevated temperatures. An advantage of this process is that the above-described acid/ammonia cycle is combined with a gas/solid carbonation cycle that provides all or part of the heat for the recovery of the acid and the ammonia.

After generating a solid magnesium precipitate product, e.g., a magnesium hydroxide product, this product is carbonated at elevated pressure and temperature, for example, in an autoclave system. In such systems, the temperature is typically about 400° C. or 500° C. or above, and the pressure is typically about 1 atmosphere, (ambient pressure), to about 50 atmospheres or greater. In the process, magnesium hydroxide reacts with gaseous $CO_2$ in a carbonation cycle. The reaction is exothermic; and with appropriate heat management, for example, the use of suitable heat exchangers and/or the design of a physical plant to allow efficient heat transfer, this heat can be collected and applied to the recovery of the ammonia and the acid in the method. The heat of the reaction is thus harnessed and utilized. For added efficiency, the system embraces a counterstream heating of reactants with the sensible heat stored in the reaction products. To capture and essentially dispose of $CO_2$, the ammonia and carbon dioxide cycles can be "tied together" and the energy in both can be shared. Since the overall reaction is exothermic, this can provide a substantial reduction in the energy penalty incurred by currently-performed mineral carbonation processes.

In another embodiment, the above-described process can include the electrochemical recovery of ammonia gas and acid, e.g., by the use of electrodialysis. For, example, electrochemical recovery comprises introducing the salt brine into a dialysis apparatus, for example, a conventional electrodialysis apparatus that separates positive and negative ions with an applied current, thereby effectively re-creating the acid and the base of the above process. The brine can be diluted prior to dialysis, as a higher dilution typically requires the use of smaller electromotive forces. The electromotive force serves to separate the anions and cations of the salt and to recreate the acid and base from which the salt was formed. A more concentrated solution will have more ions per unit volume and will require more electromotive force to separate the ions. In general, the stronger the acid and the base, the higher the pH change that needs to be maintained in the apparatus, which typically is comprised of one or more cells, or one or more stacks of cells to reduce energy demand. The cells are comprised of bipolar membranes and cationic and anionic membranes, as known to and used by skilled practitioners in the art. For example, in a cell, the bipolar membrane can be situated between the cationic and anionic membranes. Also, the cationic and anionic membranes can be alternating.

Illustratively, the basic dialysis unit contains one cationic and one anionic membrane with one bipolar membrane on either end. The bipolar membrane splits water into hydroxide and hydrogen ions, which allows the acid and base to reform. In addition, hydrogen and oxygen gas are formed. A stack of cells decreases the amounts of these gases that are formed per unit acid/base recovered, and therefore improves the economics of the process and system. If the acid is a weak acid, e.g., oxalic acid, then the acid does not completely disassociate; thus, the pH on the acidic side stays higher, compared with a strong acid, e.g., HCl. If the positive ion is a weak base, which limits the formation of free OH-ions in the brine, then the pH remains lower than for a strong base, e.g., NaOH.

When ammonia is involved in the electrodialysis system, the ammonium ($NH_4$) ion itself dissociates into $NH_3$ and $H^+$, and the $NH_3$ leaves the solution as a gas, which can be re-captured and re-used in the above-described process. As ammonia is a weak base, the use of ammonia limits the pH of the solution such that the pH is not raised as high as by using a stronger base, such as NaOH. In general, the lower the pH difference between the acid and the base sides of the dialysis system, the lower the electromotive force that is required. Therefore, the energy penalty is lowered in the process involving electrodialysis. Accordingly, ammonia reagents, such as ammonium oxalate, ammonium citrate, ammonium sulfate, ammonium hydroxide, ammonium carbonate, or ammonium bisulfate are advantageous in the method described herein. In addition, at the end of the dialysis, water can be removed, for example, by the use of osmotic membranes that reduce the water content of the solution as it leaves the dialysis unit.

In another embodiment related to the above process for extracting or capturing $CO_2$ from air, the base can be carbonated prior to its introduction into the brine comprising magnesium according to the above process. For example, sodium hydroxide could be exposed to air and absorb $CO_2$ from the ambient air. If this sodium hydroxide is then introduced into the process, carbonates would immediately be formed in the process, prior to the precipitation of magnesium components.

In another embodiment, magnesium hydroxide resulting from the above-described process is washed to remove residual salt, e.g., sodium chloride, and is exposed to $CO_2$ above ambient temperature (e.g., about 25° C.) and pressure (about 1 atm or 1 bar) to produce magnesium carbonate. In this embodiment, the carbonation reaction can operate at elevated temperatures, for example, from about 300° C. to less than about 900° C., or from about 300° C. to about 500° C., and pressures of about 1 (i.e., ambient) to 50 atmospheres. Higher pressures and temperatures are also encompassed, although it is to be appreciated that the high cost of pressurization may render higher pressures undesirable. Preferably, the heat content from the reaction products (e.g., steam and magnesium carbonate) is transferred to the reactants (e.g., $CO_2$ and magnesium hydroxide to avoid the loss of the heat of the reaction into the heating of the reactants. This is accomplished using commercially available heat exchangers, which are units built specifically to allow two materials to transfer heat without physically contacting each other, such as in a car radiator. The reaction can deliver a substantial amount of heat energy if the incoming $CO_2$ is heated against the outgoing steam. In addition, the gases can be used to transfer heat between the incoming and outgoing solids. For example, if the reactants enter a vessel at its operating temperature, then any heat that is generated can be recovered. The heat generated by the reaction vessel, e.g., 68 kJ/mole of $CO_2$, can be used to generate steam and/or electricity for further use. Thus, the processes as described ideally expend minimal energy to heat the reactants so that this energy is more easily recovered.

In another embodiment, the magnesium carbonate is gently sintered during the cool-down process. Sintering reduces the reactivity of a solid; thus, if magnesium carbonate, for example, is sintered, it is less likely to dissolve when exposed or subjected to water.

Suitable acids for use in the above-described process for sequestering, reducing, and/or eliminating $CO_2$ include those that can dissolve serpentine, olivine, or similar magnesium bearing silicates. Illustratively, citric acid, oxalic acid, acetic acid, chromic acid, sulfuric acid, orthophosphoric acid, oxalic acid, ammonium bisulfate and combinations thereof, are nonlimiting examples of suitable acids for use in the process. Dissolution by the acid should occur in an aqueous system, preferably with a high concentration of acid. A suitable concentration range for the acids comprises, for example and without limitation, from about 0.01 mol/L to about 10 mol/L. The reaction should progress rapidly, for example, in minutes to hours, depending on the strength of the acid and the fineness of the powder resulting from the dissolution process. For example, dissolution using HCl, an exemplary strong acid, can occur in 5 minutes or less for a fine powder. For a weaker acid, e.g., citric acid, dissolution can take 5 minutes or longer to several hours. Heat need not be a component of the reaction; however, the smaller the amount of heat released in the process, the more advantageous the acid. Illustratively, and without limitation, acid used for dissolving or digesting in the methods may be present in an amount that is about 1% to about 20%, or about 10%, in excess of the stoichiometric amount.

For the above $CO_2$ sequestration, reduction, and/or elimination process, the magnesium and iron salts of the acids are preferably relatively soluble in water. The solubility of the ammonia salt is a strong function of the temperature, i.e., changing the temperature of the solution is an efficient way to recover the salt. A suitable precipitate of the ammonium salt is free of water and the anhydrous form of the acid is a solid. In addition, the ammonium salt can comprise ammonia and the anhydrous form of the acid. The lower the temperature of the ammonia release, the better the salt is for use in the process. Similarly, to reconstitute the salt, the heat of formation of the ammonia salt is preferably small. Accordingly, for optimum operating conditions, lower temperatures and less water in the process result in less energy expended in carrying out the process.

In an embodiment, the present invention encompasses a method of extracting or sequestering carbon dioxide, for example, from air, comprising (a) dissolving a magnesium bearing silicate in an aqueous acid to form an acidic solution; (b) increasing the pH of the solution of step (a) to precipitate one or more magnesium components; and (c) carbonating the precipitated magnesium components from step (b) to bind carbon dioxide. In another embodiment, the method comprises (d) recovering ammonia gas and acid, e.g., by thermal decomposition or by electrodialysis. In an embodiment, the method the magnesium bearing silicate of step (a) comprises peridotite rock, which can be, for example, serpentine or olivine. In an embodiment, the aqueous acid can be citric acid, acetic acid, chromic acid, sulfuric acid, orthophosphoric acid, oxalic acid, ammonium bisulfate, or a combination of two or more thereof. In an embodiment, the pH of the acidic solution is less than or equal to about pH 4.5. In another embodiment, the method can further comprise neutralizing the acidic solution of step (a) with a neutralizing agent to precipitate iron and silicate. In an embodiment iron and silicate are precipitated prior to the precipitation of one or more magnesium components. In an embodiment, this neutralizing step comprises a neutralizing agent, which can be ammonia or magnesium hydroxide. In an embodiment, the pH of the neutralized solution is less than or equal to about pH 8. In an embodiment, increasing the pH in step (b) involves the use of an ammonia-containing reagent; the reagent can be selected from NaOH, KOH, $NH_3$, $NH_4OH$, $(NH_4)_2CO_3$, $NH_4HCO_3$, $Na_2CO_3$, or a combination thereof. In another embodiment, the method can include the use of a reagent that is carbonated prior to precipitating the one or more magnesium components in the step of increasing the pH of the acidic solution. In another embodiment, the ammonia-containing reagent is selected from ammonia, ammonium hydroxide, ammonium carbonate, or ammonium bicarbonate. In another embodiment, the reagent that is carbonated prior to precipitating the one or more magnesium components is an ammonia-containing reagent. In other embodiments, the one or more magnesium components of step (b) is $Mg(OH)_2$ or $Mg(CO)_3$. In an embodiment, the one or more precipitated magnesium components is carbonated in step (c) by thermal decomposition, e.g., heating, which can be at a temperature of about 300° C. to less than about 900° C., or about 300° C. to about 500° C., or carried out in an autoclave under pressure, e.g., at about 1 to about 50 atmospheres or greater. In an embodiment, the method can further comprise, following step (c), (i) washing the precipitated magnesium component to remove residual salt; and (ii) exposing the precipitated and washed magnesium component to carbon dioxide at elevated temperature and pressure. Elevated temperature can be about 300° C. to less than about 900° C., or about 300° C. to about 500° C., and the elevated pressure can be about 1 to about 50 atmospheres. In an embodiment, precipitated magnesium component in the methods is magnesium hydroxide or magnesium oxide. In another embodiment, the method further comprises recovering ammonia gas and acid following step (c) by thermal decomposition, e.g., heating, or by electrodialysis. In another embodiment of the method, the acid of step (a) is present in an amount at least about 10% in excess of a stoichiometric amount for neutralizing magnesium in the magnesium bearing silicate.

In another embodiment, the present invention embraces a method of extracting, sequestering, reducing, or eliminating carbon dioxide involving (a) dissolving a magnesium bearing silicate in an aqueous acid to form an acidic solution; (b) neutralizing the acidic solution with a neutralizing agent to precipitate iron and silicate; (c) precipitating magnesium components, e.g., Mg salt, from the solution with a base, such as, for example, an ammonia-containing reagent; and (d) carbonating the precipitated magnesium component from step (c) to sequester, reduce, or eliminate carbon dioxide. In addition, thermal decomposition, e.g., heating, or electrochemical processes can be used to recover ammonia and acid. In this method the magnesium bearing silicate of step (a) can comprise peridotite rock, such as serpentine or olivine. Examples of acids suitable for use in the method include, but are not limited to, citric acid, oxalic acid, orthophosphoric acid, acetic acid, chromic acid, sulfuric acid, or ammonium bisulfate, which can provide an aqueous acidic solution with a pH of about pH −1 to about pH 4.5, or a pH of less than about 4.5. Suitable yet nonlimiting neutralizing agents for use in the method include ammonia or magnesium hydroxide, which can provide a neutralized solution with a pH of near 7 for purposes of precipitating out impurities like iron and silicates. Bases other than $Mg(OH)_2$ or Mg salts can be used to precipitate magnesium from the solution, as they will drive the solution to pH values from about pH 8-9 (e.g., ammonia) to about pH 14 (e.g., NaOH). In addition, the base used in the method can be an ammonia-containing reagent, e.g., without limitation, $NH_4OH$, $NH_3$, $(NH_4)_2CO_3$, or $NH_4HCO_3$, or a combination thereof. Other bases can include NaOH, KOH, or $Na_2CO_3$, or a combination thereof.

In an embodiment, the base of the above step (c) is carbonated prior to precipitating the one or more magnesium components. In an embodiment, the magnesium component in step (c) is $Mg(OH)_2$ or $Mg(CO)_3$. In an embodiment, the precipitating agent is an ammonia-containing reagent, such as, without limitation, ammonia, ammonium hydroxide, ammonium carbonate, or ammonium bicarbonate. In another embodiment, following step (c) of the method, the precipitated magnesium component is washed, e.g., by flushing the isolated filtrate with water, to remove residual salt, and the precipitated and washed magnesium component is exposed to carbon dioxide at an elevated temperature, e.g., about 300° C. to less than about 900° C., and pressure, e.g., about 1 to about 50 atmospheres, or greater. Exposure of the magnesium component to carbon dioxide can be performed in an autoclave or in any other high temperature solids reactor. In another embodiment, the precipitated magnesium component in the method is carbonated in step (d) by thermal decomposition, e.g., heating, for example, at a temperature of about 300° C. to less than about 900° C., or about 300° C. to about 500° C., at atmospheric pressure or elevated pressure, such as in an autoclave. In another embodiment, electrochemical processes are employed to recover ammonia and acid.

In another embodiment, a method of $CO_2$ extraction comprises (a) dissolving a magnesium bearing silicate in an aqueous acid to form an acidic solution; (b) neutralizing the acidic solution to remove dissolved silica and produce a dissolved magnesium component; (c) precipitating a solid magnesium component from the neutralized solution with an ammonia containing reagent, thereby producing an ammonium salt in the solution; (d) precipitating the ammonium salt from the solution; and (e) carbonating the precipitated magnesium component to extract, sequester, eliminate, or reduce the carbon dioxide. In this embodiment, the magnesium bearing silicate of step (a) can comprise peridotite rock, such as serpentine or olivine. Examples of acids suitable for use in the method include, but are not limited to, citric acid, oxalic acid, orthophosphoric acid, acetic acid, chromic acid, sulfuric acid, ammonium bisulfate, or a combination of two or more thereof, which can provide an aqueous acidic solution with a pH from about pH −1 to about pH 4.5, or less than pH 4.5. In some embodiments, the acid of step (a) is typically present in an amount/concentration of about 1% to about 20%, or about 10%, in excess of stoichiometric need. In the method, the ammonia-containing reagent of step (c) can be ammonia, ammonium hydroxide, ammonium sulfate, ammonium oxalate, ammonium citrate, ammonium carbonate, or ammonium bisulfate. In one embodiment, the ammonia-containing reagent is carbonated prior to precipitating the magnesium component, e.g., $Mg(OH)_2$. or $Mg(CO)_3$. In one embodiment, following step (c) of the method, the precipitated magnesium component is washed to remove residual salt, and the precipitated and washed magnesium component is exposed to carbon dioxide at an elevated temperature, e.g., about 300° C. to less than about 900° C., or about 300° C. to about 500° C., and pressure, e.g., about 1 to about 50 atmospheres, or greater. In one embodiment, the ammonium salt of step (d) is precipitated by reducing the volume of the solution, e.g., by evaporation or membrane separation. In another embodiment, the ammonium salt of step (d) is precipitated by reducing the temperature of the solution. In one embodiment, the ammonium salt precipitate of step (d) is free of liquid water. In one embodiment, the carbonating step is performed by temperature elevation, e.g., heating, for example, to a temperature of about 400° C. to about 500° C. or above, at atmospheric or elevated pressure. Elevated pressure, e.g., about 1 to about 50 atmospheres or greater, can be achieved, for example, by use of an autoclave. In one embodiment, ammonia and acid can be recovered following step (e). The recovered acid can be solid and anhydrous. In one embodiment, the ammonia and acid are recovered by thermal decomposition. In another embodiment, the ammonia and acid are recovered through the use of electrochemical techniques.

In another embodiment, the invention encompasses a method for extracting, reducing, or sequestering carbon dioxide, which comprises (a) dissolving a magnesium bearing silicate in an aqueous acid to form an acidic solution; (b) increasing the pH of the solution of step (a) to neutralize the acidic solution of step (a); (c) introducing ammonium carbonate or ammonium bicarbonate into the solution of step (b) to precipitate magnesium carbonate or related hydrated forms thereof; and (d) carbonating the ammonia to form ammonium carbonate or bicarbonate so as to bind carbon dioxide. In a related embodiment, ammonia gas and acid are recovered following step (c) and prior to step (d). In an embodiment, the magnesium bearing silicate of step (a) comprises peridotite rock, which can be serpentine or olivine, for example. In an embodiment, the aqueous acid of step (a) is selected from citric acid, acetic acid, chromic acid, sulfuric acid, orthophosphoric acid, oxalic acid, ammonium bisulfate, or a combination of two or more thereof. In an embodiment, the pH of the acidic solution is less than or equal to about pH 4.5. In an embodiment, the iron and silicate precipitate in the neutralized solution of step (b) and prior to precipitation of magnesium carbonate or its related hydrated forms. In an embodiment of the method, the pH is increased using a neutralizing agent selected from ammonia or magnesium hydroxide; in an embodiment, the pH of the neutralized solution is less than or equal to about pH 8. In an embodiment, increasing the pH in step (b) comprises an ammonia-containing reagent, which can be one or more of NaOH, KOH, $NH_3$, $NH_4OH$, $(NH_4)_2CO_3$, $NH_4HCO_3$, $Na_2CO_3$, or a combination thereof. In an embodiment, the ammonia-containing reagent is selected from ammonia, ammonium hydroxide, ammonium carbonate, or ammonium bicarbonate.

In another embodiment, the present invention embraces a method of extracting, sequestering, reducing, or eliminating $CO_2$ from the air using solid sorbents. In this embodiment, $CO_2$ can be extracted or captured directly from the air using the solid sorbents. Thereafter, the sorbent is recycled and the captured $CO_2$ is recovered in a pressurized stream of concentrated, nearly pure $CO_2$. Solid materials having a high affinity to $CO_2$ can absorb $CO_2$ even at the low partial pressures as found in air. In accordance with this embodiment, the solid sorbent material is exposed to air. Suitable absorbers or sorbents for use in the method include, without limitation, easily-handled small objects, such as, for example, beads or rods that move along surfaces exposed to the air. Such objects serve as collection surfaces and need not be of any particular shape or size, but are exposed to air that flows over and/or around and/or through them. Alternatives to beads or rods include absorber materials that can be fashioned into fabric-like materials that are exposed to the air and absorb the $CO_2$, or a fraction thereof, that is present. Other alternative materials include small boards with rough surfaces that are attached to wheels rolling down a track, for example. It will suffice for the suitability of the absorber (sorbent) that air can reach the absorber surface(s) and $CO_2$ can be bound, either loosely or tightly to the $CO_2$ sorbent.

Absorber materials can be solid sorbents, i.e., the entire material is sorbent throughout. Alternatively, the absorber material can comprise an inert material of which one or more surfaces are coated with one or more sorbents. In either case, a large amount of absorption surface is intended. After exposure to a $CO_2$ source, the sorbent surfaces become saturated with carbon dioxide and cease taking up carbon dioxide. A preferred sorbent material is one that takes up $CO_2$ under ambient conditions, and releases a substantial fraction (e.g., in excess of 10%) of the $CO_2$ at pressures that are not significantly lower than ambient pressure. The sorbent material is preferably inert, apart from its affinity to bind $CO_2$. In addition, the absorber may or may not absorb water; it is desirable that the absorber does not absorb water. Alternatively, at least the $CO_2$ will quantitatively displace water from the binding surface of the sorbent material. If the solid sorbent material absorbs water, it is preferable that it does not release water in the recycle step of the method described below, because (i) the material has been displaced by $CO_2$, and thus is not present in the recycle loop; (ii) it has bound tightly enough to remain attached to the sorbent; and/or (iii) the water vapor pressure in the recovery cycle is sufficiently high to prevent the freeing of water. Should water absorb onto the sorbent and displace $CO_2$, more energy is consumed in the process; this is not a particularly desirable result. Thus, the sorbent material should be less attractive to water than it is to $CO_2$ so that $CO_2$ absorption is not reduced, or so that $CO_2$ is not released during sublimation.

Illustrative and nonlimiting examples of solid sorbent materials for use in the methods of this invention include hydrophobic carbon compounds that absorb $CO_2$ from the air (Oak Ridge National Laboratory, Oak Ridge, Tenn.), activated carbon (amorphous carbon solids, often from natural biomass sources), molecular sieve carbon (MSC) (fossil fuel, e.g., coal, petroleum), carbon fiber composite molecular sieves (CFCMS), formed by joining petroleum pitch-derived carbon fibers with a phenolic resin-derived binder to form a monolithic, highly porous carbon filter "cake", activated alumina, and natural ("mineral") and synthetic zeolites, or specialized zeolites, such as silicalites. Zeolites can include, for example, A, X, Y, or mordenite, etc. which tend to possess the physico-chemical properties that allow them to bind $CO_2$. Other zeolites, such as those having a high Si/Al ratio, such as silicalite, tend to be more stable to hydrothermal treatments and have less affinity to water. Such materials can be hydrophobic and could serve as $CO_2$ capturing agents that are not affected by the presence of water vapor. Other useful zeolites are those having a high sodium content combined with a medium Si/Al ratio. In addition, suitable solid sorbents offer several advantages, including low binding energy, high stability, selectivity, high absorption capacity, kinetic advantages, and simplicity of system design.

In another embodiment, a cryogenic pressure system is embraced to perform the $CO_2$ capture, sequestration, reduction, or elimination methods of this invention. In accordance with this embodiment, the $CO_2$-saturated sorbent material is packed into a first chamber at room temperature that can be evacuated. The first chamber can be connected to a low-grade vacuum system that removes remnant air that is caught in or on the sorbent material. After a pressure reduction in the first chamber from atmospheric pressure to near vacuum pressure, $CO_2$ is allowed to flow from the sorbent into a second chamber where the $CO_2$ condenses onto cold surfaces (e.g., solid substrates) as solid carbon dioxide. $CO_2$ flow can be controlled by the opening of a valve or another means that achieves the desired result. The pressure in the second chamber is lower than the vapor pressure of $CO_2$ in the first chamber, and can depend upon the type of absorbent material that is utilized in the second chamber. At sufficiently low temperature, any surface material is suitable for the purpose of this method.

Illustratively, the pressure of the second chamber can be about 100 ppm of an atmosphere, or about 0.001 psi. The temperature in this second chamber is low enough for the $CO_2$ to condense out, e.g., in the form of dry ice. Accordingly, the temperature is about $-80°$ C. or $-100°$ C. or lower. Liquified air may be used as a coolant. Without wishing to be bound by theory, because the temperature in the second chamber is below the freezing point of $CO_2$, the equilibrium partial pressure of $CO_2$ in the second chamber is far lower than the pressure of $CO_2$ over the saturated (warmer) $CO_2$ sorbent surfaces in the first chamber. As a consequence, the system establishes a pressure gradient between the two chambers and the $CO_2$ travels from the chamber having higher pressure to the chamber having lower pressure chamber until enough $CO_2$ has been removed from the sorbent so that the partial pressure in the first sorbent chamber has dropped as well. When a substantial amount of carbon dioxide has formed as dry ice on the solid surface(s), which serve as a "cold trap" within the second chamber, the collected dry ice is confined to a small volume and brought to ambient temperature. As the dry ice warms up, it turns into $CO_2$ gas, which, as it is confined to a small volume, will be produced at a high pressure. This gas is then released under pressure from the cryogenic system, e.g., into containment vessels and the like, for further storage or collection.

In this embodiment, the partial pressure of $CO_2$ is reduced over the system to the point that a substantial fraction of the adsorbed $CO_2$ is released and captured in the cold trap. The dry ice that forms in the cold trap is collected over time, e.g., from about 15 minutes to several hours, or from about 20 minutes to one hour. For example, the rate of heat transfer between the cold trap and the solid sorbent in the second chamber can be as fast as about 50 $g/m^2/sec$. Thus, a system containing 1 ton of sorbent containing about 50 kg of $CO_2$ could release its $CO_2$ as dry ice in about 20 minutes. When sufficient amounts of dry ice are available, the dry ice is confined to a small volume, e.g., by scraping it from the cold trap and moving it to a suitably sized vessel. The size of the vessel is such that when the solid $CO_2$ is allowed to warm or heat to ambient conditions, it is then at the desired pressure. The $CO_2$ is then released under pressure, e.g., about 60 to about 200 bar pressure, to a suitable or desired $CO_2$ containment vessel, or handling, storage, or transportation system. Advantageously, such a vacuum system effectively requires no pumps to pressurize gaseous $CO_2$. By keeping the $CO_2$ confined, pressure is obtained from the energy input that was provided in the refrigeration system that maintained a low temperature in the cold trap.

In another embodiment, the present invention embraces a system comprising a solid sorbent for $CO_2$ capture comprising impregnated support matrices or substrates, e.g., cloth materials, to transport solid particles into and out of an air stream. This system removes carbon dioxide from the atmosphere in a manner akin to that of a wind capture device. The support matrix provides a means of moving the solid sorbent into and out of the air stream, similar to the operation of a conveyor belt. The air stream can be air, or a flue gas, or essentially any substance, material, or matter that comprises $CO_2$. In an embodiment, the solid sorbents are mounted or made to adhere to a solid matrix or substrate, such as a cloth material, which is then placed on a moving system, e.g., a clothesline-type system, to move the matrix or substrate into the air stream, e.g., wind, and back again.

In another embodiment, particulates are used inside a chamber (or container) followed by air filtration systems that recapture particulates from the stream. The system according to this embodiment is similar to a fluidized bed. One or more solid sorbents can be placed into a moving gas stream, air or flue gas, where the sorbent "floats" around while absorbing $CO_2$. After a specified period of time the sorbent is removed and the absorbed $CO_2$ is stripped therefrom, for example, by diverting the gas stream through a second chamber (or container). Accordingly, one chamber (or container) absorbs while the second chamber (or container) is being recycled without release of the particulates to the environment.

In another embodiment, the present invention embraces methods and systems for extracting $CO_2$ from the air using liquid sorbents. Accordingly, the invention provides a method of carbon capture that removes $CO_2$ from air using solid oxide membrane and liquid sorbents. Suitable sorbents include basic solutions, such as sodium hydroxide (NaOH) or potassium hydroxide (KOH), and other often viscous fluids, which are typically caustic. More specifically, the method involves the use of a hydroxide-based, alkaline liquid sorbent, e.g., NaOH solutions and the like, to absorb and remove $CO_2$ from ambient air and produce carbonate ions. The resultant sodium carbonate ($Na_2CO_3$) solution is mixed or reacted with calcium hydroxide ($Ca(OH)_2$) to produce sodium hydroxide and calcium carbonate ($CaCO_3$) in a causticizing reaction, which transfers the carbonate anion from the sodium to the calcium cation. The calcium carbonate precipitates as calcite, leaving behind a regenerated sodium hydroxide sorbent, thus, regenerating the sorbent. The calcite precipitate is dried, washed and thermally decomposed to produce lime (CaO) in a calcination process. The thermal decomposition is preferably performed to avoid mixing the $CO_2$ resulting form the combustion process, providing the heat with ambient air. This embodiment uses solid oxide membranes to separate input air from the combustion process. Oxygen at elevated temperatures can pass through these membranes. After calcination, the lime is hydrated in a slaking process. In a related embodiment, this method can be implemented using air capturing systems, for example, towers or air capture units of various design, which function as the physical sites where $CO_2$ is captured and removed from the air.

In yet another embodiment, the resultant NaOH is recycled using sodium tri-titanate rather than calcium hydroxide. In this embodiment, the reaction occurs in a molten rather than in an aqueous state. As a result, the absorption solution is highly caustic in order to minimize the amount of water evaporation required. In another embodiment, the invention encompasses a method for capturing carbon dioxide from air, comprising (a) exposing air containing carbon dioxide to a solution comprising a base resulting in a basic solution which absorbs carbon dioxide and produces a carbonate solution; (b) causticizing the carbonate solution with a titanate containing reagent; (c) increasing the temperature of the solution generated in step (b) to release carbon dioxide; and (d) hydrating solid components remaining from step (c) to regenerate the base comprising step (a). In one embodiment of this method, the base of step (a) is selected from sodium hydroxide, calcium hydroxide, or potassium hydroxide. In another embodiment, the carbonate solution of step (a) of the method is a sodium carbonate ($Na_2CO_3$) solution. In another embodiment of the method, the solution of step (a) is causticized with sodium tri-titanate.

In related embodiments, the present invention provides systems and apparatuses for extracting, capturing, or entraining $CO_2$ from the air or wind. Such capture apparatuses can include a wind capture system or a cooling-type tower for extracting, sequestering, or capturing $CO_2$ as further described herein. Fan driven systems are encompassed. Wind capture systems refer to freestanding objects similar in scale to a wind energy turbine. For example, such devices contain a pivot that ensures that contacting surface can follow the wind directions. The device can operate with either liquid or solid $CO_2$ sorbents. A liquid based system operates using pumps at the base, which pump sorbent to the top of the device. Once at the top, the sorbent flows under gravity back to the bottom via a circulation system. The circulation system can encompass troughs or other flow channels that expose the sorbent to air. Alternatively, the system could be vertical wires on which sorbent flows from top to bottom. The device is sized such that the sorbent is saturated in one pass. A solid system contains moving components on which one or more solid sorbent is bound. These components are mechanically raised into the wind so as to absorb $CO_2$. Once saturated, the components are removed from the wind stream, isolated and stripped of $CO_2$. In another embodiment, a cooling tower contains a $CO_2$ removal zone in the air inlet at the base, which may contain either solid or liquid sorbents in a manner described above.

In another embodiment, a $CO_2$ capture system according to this invention can comprise filter systems wetted by a flow of sodium hydroxide that readily absorbs $CO_2$ from the air, and in the process, converts it to sodium carbonate. Without wishing to be bound by theory, if the pressure drop across the system due to viscous drag is comparable to the kinetic energy density in the air, then the fraction of $CO_2$ removed from the flow stream becomes significant, so long as the sorbent materials are strong absorbers. This is because the momentum transfer to the wall follows essentially the same physical laws of diffusion as the carbon dioxide transfer. In a cooling tower type of system, intake air is pulled through a filter system that is continuously wetted with sodium hydroxide. Another type of system can involve a slight pressure drop generated by other means. In yet another system, air contacts sorbent surfaces simply by the wind (or moving air) passing through the device or system. It will be appreciated that in the design of a contact system, the rate of absorption should be considered. In this regard, the volume of sorbent per unit output of $CO_2$ is independent of the specific details of the air contacting design.

Advantageously, air extraction of $CO_2$ and systems for this purpose can be sited based on site-specific conditions, which can include temperature, wind, renewable energy potential, proximity to natural gas, proximity to sequestration site(s) and proximity to enhanced oil recovery site(s). The system should be designed for ease of relocation. For example, the extractor may be sited at an oil field in order to minimize transport. In such a case, oil could be reformed and used in the calcination system.

In other embodiments, chemical processes, e.g., calcinations and calcining carbonate, are encompassed for the recovery of $CO_2$. One process involves oxygen blown calcinations of limestone with internal $CO_2$ capture. Such calcinations are carried out in a calcining furnace that uses oxygen rather than air. The use of oxygen results in the product stream including only $CO_2$ and $H_2O$, which can be easily separated. In addition, power plant and air capture sorbent recovery can be integrated into one facility. Another process involves electrically heated calcinations. Yet another process involves solid oxide ionic membranes and solid oxide fuel cell (SOFC)-based separation processes (e.g., Example 2). Another chemical process involves the electrochemical separation of $CO_2$ from $Na_2CO_3$, for example, using a three-chamber electrolytic cell containing one cationic membrane and an anionic membrane. The cationic membrane is located between the central cell and the negative electrode while the anionic membrane is located between the center and the cathode. A current is applied to the cell and then sodium carbonate is introduced into the center cell. The ions move toward the opposite electrode. Hydrogen is evolved at the anode and oxygen gas is evolved at the cathode, resulting in the formation of NaOH at the anode and carbon dioxide gas at the cathode. Several cells can be stacked together by placing a bipolar membrane at the electrode locations of the single cell. This serves to reduce the amount of gas evolved per unit reagent regenerated.

The present invention embraces remote $CO_2$ sequestration sites via air capture. Such remote sequestration following the capture of $CO_2$ from air can include ocean disposal from floating platforms or mineral sequestration in territories or environments having the appropriate mineral sites and deposits. The capture of $CO_2$ from air allows $CO_2$ to be disposed of in remote areas that otherwise would be inaccessible to $CO_2$ disposal due to the prohibitively high cost of transporting $CO_2$ to remote locations.

The present invention further encompasses $CO_2$ extraction from the ocean using limestone and dolomite as sources of alkalinity. If provided with sufficient alkalinity, the ocean can remove carbon dioxide from the air. According to this embodiment, ocean disposal can be improved by calcining limestone or dolomite to capture $CO_2$ from the air. During this process, $CO_2$ is released to the air, but the resulting $CO_2$ uptake is nearly twice as large as the initial $CO_2$ emission. Thus, a metal hydroxide, e.g., magnesium or calcium hydroxide, dissolved into the surface of the ocean will raise the alkalinity of the water leading to the additional capture of two moles of $CO_2$ for every mole of $CO_2$ entered into the system. Illustratively, and without limitation, in solid form, an ion, such as a calcium ion, $Ca^{+2}$, can trap one $CO_2$ molecule in the form of $CaCO_3$. However, in dissolved form, the same ion can trap two $CO_2$ molecules as bicarbonate ions ($HCO_3^-$). Therefore, limestone that is heated (calcined) as described herein releases one $CO_2$ molecule, but when it is dissolved in the ocean, two bicarbonate ions are trapped. In this embodiment, the $CO_2$ that is dissolved in the mixed layer at the top of the ocean is kept in solution by the addition of calcium or magnesium ions. The mixed layer typically, but not necessarily, reaches a depth of approximately 100 m. Suitable sources of metal hydroxides include, without limitation, limestone, dolomite, or smaller deposits of magnesium carbonates. Although calcium carbonate is supersaturated in sea water and is thus difficult to dissolve, sea water is still far below the point at which calcium carbonate spontaneously precipitates out, thereby allowing for some increase in carbonate and/or calcium in the surface waters of the ocean. Further, the total dissolved calcium in the ocean is a quite large amount; therefore, the ocean is generally insensitive to additions that could allow for substantial increases in stored $CO_2$. Magnesium carbonate also dissolves in sea water, but at a slower rate than does calcium carbonate. Also, the slow dissolution of magnesium carbonate can raise the carbonate ion concentration of sea water, which may be counterproductive to dissolving additional carbonate. Because added calcium ions disperse relatively rapidly upon exposure to the ocean surface, this can prevent a risk of precipitation of calcium carbonate into the ocean waters.

More specifically regarding this embodiment, a method is provided to introduce alkalinity into the water as one or more metal hydroxides, e.g., without limitation, MgO/CaO; $Mg(OH)_2/Ca(OH)_2$; $MgO/CaCO_3$; or $Mg(OH)_2/CaCO_3$, or a combination thereof. These metal hydroxides are calcination products obtained by calcining a suitable starting calcium carbonate- or magnesium carbonate-containing material, e.g., dolomite, limestone, or magnesite, at a temperature above about 400° C., or above about 900° C. The resulting carbon dioxide is captured and sequestered at the calcination site. For dolomite at a temperature above about 400° C., the CaO component is not calcined, while MgO is calcined at this relatively lower temperature. Calcination can be performed by conventional methods (e.g., Boynton, R. S., 1966, *Chemistry and Technology of Lime and Limestone*, Interscience Publishers, New York, pp. 3, 255, 258), or by using another energy source, such as solar energy, wind energy, electrical energy, nuclear energy, remote sites with unusable methane, etc. According to this method, the calcination product is finely dispersed into ocean or sea water by various procedures. For example, introduction into the water can occur from one or more ships or vessels that drag behind or between them a line that drops fine powder in the water. The size of the line is long enough so that local concentrations of the material are not driven very high. Alternatively, the calcination products can be fashioned into larger pellets, as conventionally known in the art. The pellets are dropped or ejected into the water, dissolve slowly and distribute the material relatively uniformly over a larger area as they drift along. Pellets should contain sufficient amounts of air, e.g., have sufficient air pockets, to float. Such pellets can advantageously be added to the water in larger quantities versus a fine dispersion. Of particular interest are pellets comprising $CaCO_3/MgO$ mixtures. By the practice of this method, the net $CO_2$ balance is positive, even if the $CO_2$ from the calcination is not captured. Notwithstanding, for every $CO_2$ molecule released by this method, nearly two $CO_2$ molecules are absorbed into the ocean, which takes up $CO_2$ from distributed sources.

In another embodiment, the present invention relates to methods of transitioning from today's energy system comprising unsequestered $CO_2$ resulting from the use of fossil fuels to the capture and disposal of $CO_2$, and ultimately, to renewable energy with recycling of $CO_2$. Such transitioning methods comprise combining $CO_2$ capture with magnesium silicate disposal. In this embodiment, $CO_2$ can be removed from the air, but rather than disposing of the removed $CO_2$, it is used as a feedstock for making new fuel. The energy for the fuel derives from a renewable energy source or any other suitable source of energy that does not involve fossil fuels, such as hydroelectricity, nuclear energy. For example, $CO_2$ is initially collected and disposed of or sequestered in underground deposits (such as in enhanced oil recovery, (EOR)) or in mineral sequestration. In this way, the source of the energy is fossil fuel that can be extracted from the ground. To maintain an environmentally acceptable material balance, the carbon must be re-sequestered or disposed of. Alternatively, carbon can be recycled as an energy carrier. Hydrocarbon, i.e., reduced carbon, contains energy that is removed by the consumer by oxidizing the carbon and the hydrogen, resulting in $CO_2$ and water. The capture of $CO_2$ from air allows the $CO_2$ to be recovered; thereafter, renewable energy can be used to convert the $CO_2$ (and water) back into a new hydrocarbon. The production of hydrocarbon can include a number of processes. Illustratively, Fischer Tropsch reactions are conventionally used to convert carbon monoxide and hydrogen to liquid fuels, such as diesel and gasoline (e.g., Horvath I. T., *Encyclopedia of Catalysis*, Vol. 2, Wiley Interscience, p. 42). Similar methods using $CO_2$ and hydrogen are also established. Hydrocarbon can be produced from $CO_2$ and hydrogen. Hydrocarbon production typically involves the use of energy, e.g., electric energy, to convert water into hydrogen and oxygen, or $CO_2$ into CO and oxygen. Thereafter, fuels such as methanol, diesel, gasoline, dimethyl-ether (DME), etc. can be made.

In other embodiments of this invention, $CO_2$ capture apparatuses and systems are encompassed, especially for use in connection with the described processes. In one embodiment, a wind capture system comprises a $CO_2$ capture apparatus in which the air delivery system relies on natural wind flow. Such a $CO_2$ capture apparatus can be situated in the same or similar areas to those in which wind turbines are employed. In another embodiment, the invention embraces a water spray tower $CO_2$ capture apparatus comprising a cylindrical tower, e.g., approximately 100 feet in height, which is open to the air at its top and contains ground level exit vents. A vertical pipe comprises the center of the tower through which water can be pumped; the pipe can be capped with a nozzle that sprays water horizontally. Water is pumped to the top and sprayed into the air. The resultant evaporation creates a pocket of air that is colder and denser than the air below it. This leads to a down draft which forces air through the exit vents. The exit vents contain a solid or liquid sorbent for $CO_2$ capture. In another embodiment, the invention embraces an air convection tower $CO_2$ capture apparatus comprising a vertical cylindrical tower that is attached to a glass skirt situated approximately 1 foot above the ground level. The glass insulates the air between the ground and itself, which raises the air temperature. The hot air then exits through the central tower. A solid or liquid $CO_2$ capture device is contained in the tower. In another embodiment, the invention encompasses a $CO_2$ capture apparatus comprising a glass covered slope, which comprises a glass sheet situated some distance above ground level, e.g., between 0.3 m and 30 m, depending on the size of the overall apparatus. The glass acts as an insulator that causes the air to heat in the sunshine and this results in a draft up the hill. The resulting flow is guided over $CO_2$ absorber surfaces, which removes $CO_2$ from the air passing through it. In another embodiment, the invention encompasses cooling towers to replace a conventional water cooling liquid with a liquid sorbent. The liquid sorbent evaporates water; in addition, the liquid sorbent collects $CO_2$ in concentrated form. In all cases, the saturated sorbent is stripped of its $CO_2$ as described herein.

Figure 1:
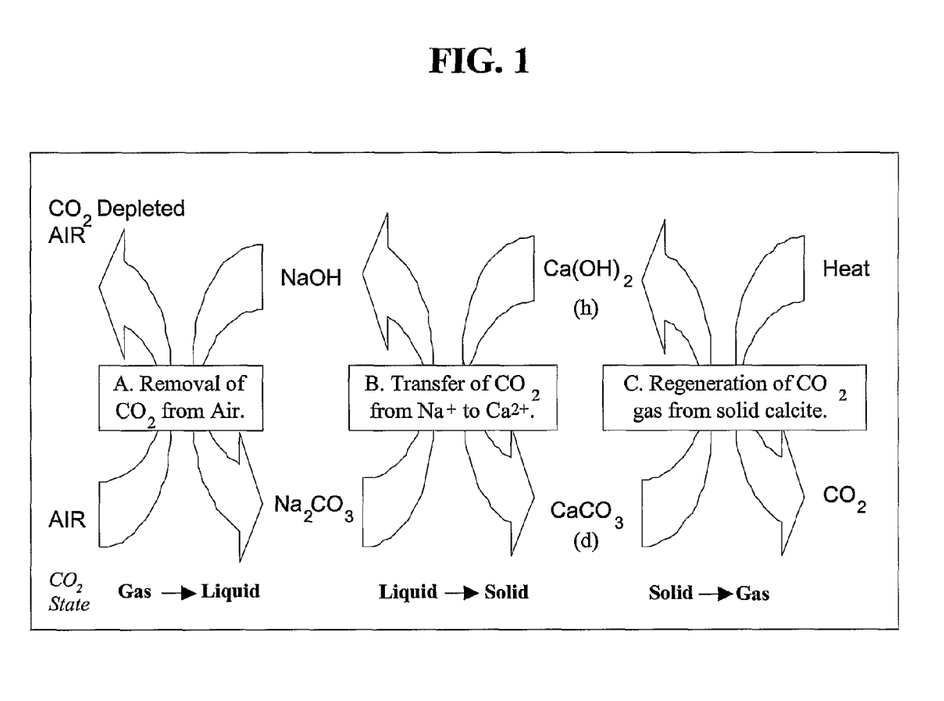
FIG. 1 presents a schematic depiction of an overview of an air extraction process. Drying (d) and hydrating (h) are not specifically shown. In accordance with an embodiment of the present invention, such a process is functionally integrated into an air capture system.
Figures 2A, 2B:
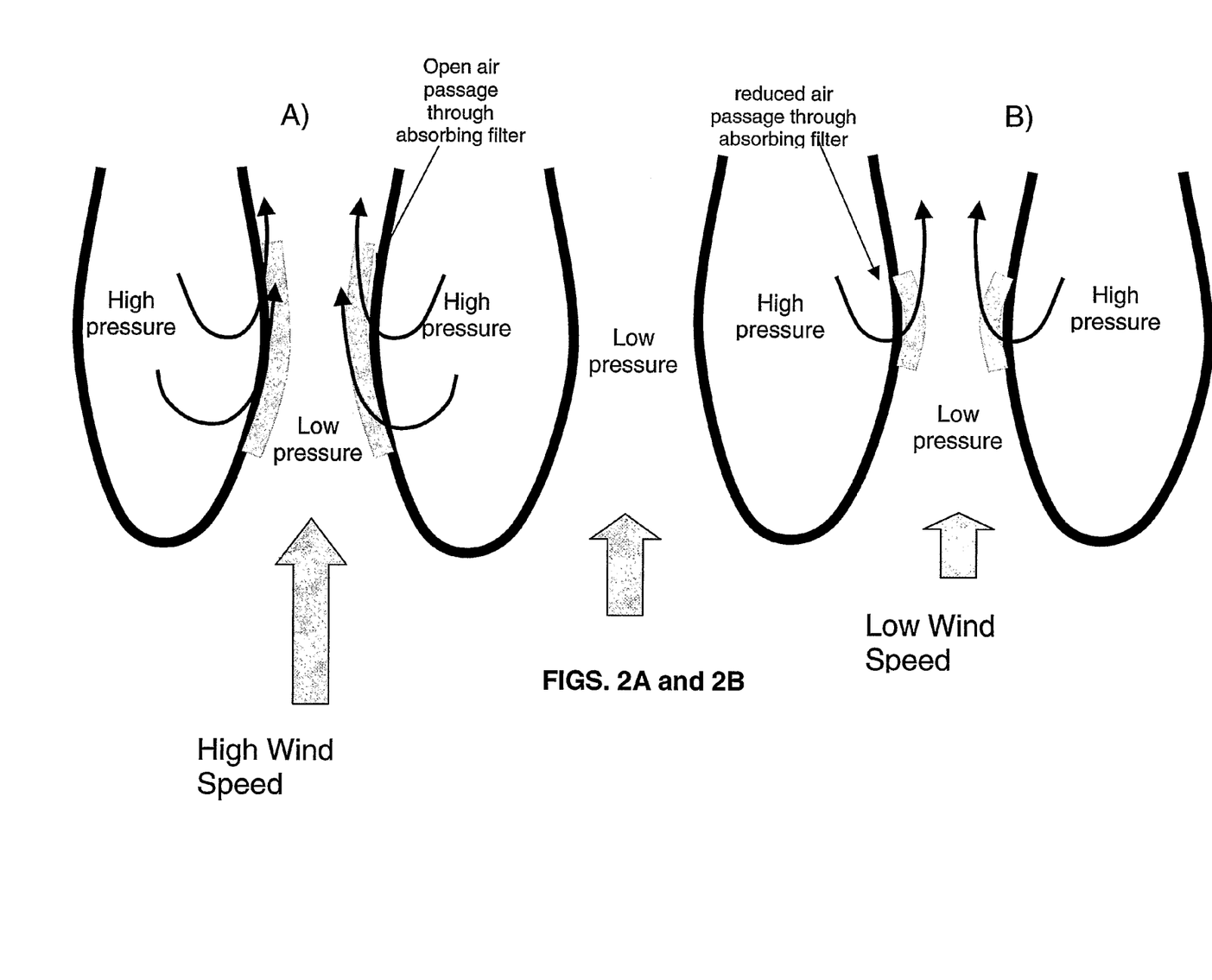
FIGS. 2A and 2B schematically depict a type of $CO_2$ capture system that is adapted to wind flow, e.g., venturi flows.

In another embodiment, wind funneling devices are optimized for throughput rather than air speed, thereby leading to optimization for $CO_2$ capture and sequestration. For example, air convection towers employed for $CO_2$ capture can be shorter than towers designed for electricity production, since increased height to promote air speed is not a requisite for $CO_2$ sequestration. Further, in such $CO_2$ capture apparatuses, textile membranes are used to separate alkaline fluids from the open air. Such membranes comprise cloth-type fabrics that allow air passage while limiting sorbent loss through spray. An illustrative, yet nonlimiting, fabric is Amoco 2019. Other $CO_2$ capture systems include those that are adapted to wind flow, e.g., venturi flows that create suction on a set of filters that are balanced by adjusting the size of the openings so as to maintain constant flow speed through the filtration system. As an example, FIG. 2 shows a solid structure (black lines) seen from above. As the air moves through the narrowed passage, the pressure drops (Venturi Effect). As a result, the higher pressure air inside the enclosures that are open to the back of the flow will have a tendency to stream into the low pressure air flow. Openings are preferably large in a high speed wind and small in a low speed wind in order to maintain a constant pressure drop across the filter system and thus optimize the efficiency of the collector even in the face of variable wind speeds. By adjusting the size of the opening, e.g., using shutters, baffles, etc., one can control the pressure drop across the filter and can control the amount of air that emerges for optimized flow rates.

It will be appreciated that fans can comprise fan driven $CO_2$ capture apparatuses and systems, e.g., in $CO_2$ capture systems at the site of an oil well to perform EOR. The use of a fan or forced air system ensures a specified air throughput, rather than having to rely on the fluctuations of natural wind. By creating a constant air flow, a specified production can be achieved which may be desirable for production schemes that require constant carbon dioxide output rates. The price for such an arrangement is higher energy cost and capital cost in the installation and operation of fans.

The examples described below are provided to illustrate aspects of the present invention and are not intended to limit the invention.

EXAMPLE 1

Capturing $CO_2$ Directly from the Atmosphere

Alkaline Sodium Sorbents: Removal of a gaseous component through contact with a liquid is known as wet scrubbing. Wet scrubbing can be divided into processes where there is a chemical reaction between the sorbate and the sorbent and where the sorbate is physically dissolved into the sorbent solution. For the air extraction process, an alkaline sodium solvent is embraced which reacts chemically with the entrained $CO_2$. The chemical reaction for this process is shown below as reaction (1):

$$2NaOH_{(aq)} + CO_{2(g)} \rightarrow Na_2CO_{3(aq)} + H_2O; \tag{1}$$

The aqueous carbonate reaction can be simplified by omitting the cation, resulting in the following ionic reaction:

$$2OH^-_{(aq)} + CO_{2(g)} \rightarrow CO_3^{2-}_{(aq)} + H_2O_{(l)} \tag{2}$$

$\Delta G° = -56.1$ kJ/mol ($\Delta H° = -109.4$ kJ/mol)

It is noted that the enthalpy and free energy of the reaction are for a nominal 1 molar solution. The thermodynamic data, given at 298K and a pressure of 1 bar, was obtained from the available literature (Lide D. R., editor in chief, *CRC Handbook of Chemistry and Physics* 81$^{st}$ Ed., CRC Press LLC, Boca Raton Fla. (2000)). As a comparison, the free energy of mixing $CO_2$ with nitrogen and oxygen to form ambient air is given by $$\Delta G = RT \ln(P_{atm}/P_{CO2}) \sim 20 \text{ kJ/mol.} \tag{3}$$

Accordingly, sodium hydroxide provides a sufficient driving force to effectively collect $CO_2$ from ambient air. Even though a lower binding energy might be desirable, the high binding energy of chemical sorbents proves useful in absorbing $CO_2$ from streams with low partial pressures of $CO_2$. As an alternative with a weaker binding energy, sodium or potassium carbonate buffer solutions can be used as sorbents. In this case the absorption can be described by:

$$CO_{2(g)} + CO_3^{2-} + H_2O_{(l)} \rightarrow 2HCO_3^- \tag{4}$$

$\Delta G° = -14.3$ kJ/mol ($\Delta H° = -27.6$ kJ/mol)

Even in this case a sufficient thermodynamic driving force is available to remove $CO_2$ from the air. For a two molar solution of bicarbonate ions, the free energy of the reaction from ambient air is negative if the bicarbonate concentration stays below 0.15 molar. A similar result can be obtained by calculating the mass action equilibrium using empirical values for the equilibrium constants. Reaction (4) is effectively trimolecular and is the result of a sequence of reactions which have fast kinetics at high temperatures or very high carbonate to bi-carbonate ratios. Otherwise the process occurs in the diffusion regime, which is much slower, making this reaction kinetically limited for air extraction.

According to the present method, chemical decomposition of the resulting sodium carbonate is achieved using calcium hydroxide as an intermediary. A sodium hydroxide solution provides a liquid sorbent that is far more easily cycled through a piping system than a calcium hydroxide suspension. Its binding energy is strong enough and its reaction kinetics fast enough to obviate the need for heating, cooling, or pressurizing the air.

Because $CO_2$ is so dilute, any such action would result in an excessive energy penalty. The hydroxide solution avoids all such complications. Since sodium hydroxide is cheaper than potassium hydroxide, the starting point for the air extraction design will be based on sodium hydroxide.

Generally in wet scrubbing, transport resistance is considered to comprise two distinct components, air side resistance and liquid side resistance. The air side resistance is dominated by the diffusion barrier in the laminar boundary layer. Typically, such a boundary layer also exists on the liquid side. In the bulk fluid, dissolved $CO_2$ reacts with water, or hydroxide ions to form carbonate or bicarbonate ions. In contrast to the reactions of $CO_2$ with water, the reactions with hydroxide reactions are very fast and their reaction time can be ignored. However, since diffusion coefficients of $CO_2$ in air are roughly four orders of magnitude larger than ionic diffusion coefficients in water, it is easy to become rate limited on the liquid side. Avoidance of liquid side rate limitations is the goal of a good design.

For a one molar carbonate ion concentration in the liquid, the concentration ratio between carbonate ions in the fluid and $CO_2$ molecules in the gas is 66,000:1. Thus, it will take time to fill up a boundary layer on the liquid side. This suggests that at sufficiently low partial pressures of $CO_2$ the extraction process will be limited by air-side resistance. For ambient air in a packed column-type system (Tepe, J. B. and Dodge, B. F., Absorption of Carbon Dioxide by Sodium Hydroxide Solutions in a Packed Column, *Trans. Am. Inst. Chem. Engrs.*, 39, 255 (1943)), $CO_2$ absorption rates have been determined to be proportional to $G^\alpha$, where G is the air flow rate and the coefficient α varies from 0.35 at low flow rates to 0.15 at high flow rates. (Spector, N. A. and Dodge, B. F., Removal of carbon dioxide from atmospheric air, *Trans. Am. Inst. Chem. Engrs.*, 42, 827-48 (1946)). This suggests that at low $CO_2$ concentrations, such as 0.031%, the liquid side resistance to transport ceases to be dominant. It is likely that in these experiments, fluid surface regeneration was sufficiently fast to prevent a built up of liquid-side flow resistance.

The advantage of using a strong hydroxide for $CO_2$ capture is a high load capacity and a fast reaction time. The removal of $CO_2$ from air can be accomplished by a system that will be limited by transport resistance in the air side of the air-liquid contact surface. In a regime where the dominant transport resistance is on the air side, it is possible to estimate the size of the $CO_2$ extractor by the air drag the extractor causes on the flow. Apart from the pressure gradient driven momentum flow, momentum transfer to the wetted surface follows a similar transport equation as the $CO_2$ diffusion. As a consequence, a system that incurs a pressure drop roughly equal to $\rho v^2$, which extracted virtually all of the initial momentum, will be able to extract a substantial fraction of the $CO_2$ from the flow. To set the scale of the operation, at 10 m/s, the air flow through an opening of 1 m² carries a $CO_2$ load that equals the $CO_2$ produced by generating 70 kW of heat from coal (Lackner K. S. et al., Carbon dioxide extraction from air: is it an option, *Proceedings of the 24th Annual Technical Conference on Coal Utilization and Fuel Systems*, (1999)). A 100 MW power plant operating at 33% efficiency would require 9,000 m² of wind cross section, if $CO_2$ collection efficiency is to be about 50%.

Causticization: Causticization refers to the transformation of sodium carbonate into sodium hydroxide. It is generally performed by adding solid calcium hydroxide to the sodium carbonate solution. The solubility of calcium hydroxide is such that an emulsion is formed according to reaction (5):

$$Na_2CO_{3(aq)}+Ca(OH)_{2(s)} \rightarrow 2NaOH_{(aq)}+CaCO_{3(s)} \qquad (5)$$

This reaction can also be written in its ionic form as follows:

$$CO_3^{2-}+Ca(OH)_{2(s)} \rightarrow 2OH^-+CaCO_{3(s)} \qquad (6)$$

$\Delta G°=-18.2$ kJ/mol ($\Delta H°=-5.3$ kJ/mol)

This process step regenerates the sodium sorbent. The $CO_2$ is removed as a solid through a filtration process. Lime, which would slake immediately in the aqueous solution, could be used as a starting material; however, in air extraction, it is important recover the heat of the slaking reaction at elevated temperatures. Thus, the slaking step has been separated from causticization.

Causticization rate has been shown to increase with temperature. The initial sodium carbonate concentration for those experiments was ~2.0 mol/l and the samples were subjected to constant stirring. Reaction (5) eventually approaches equilibrium and causticizing efficiency is generally in the range of 80 to 90%. Causticizing efficiency refers to the amount of sodium carbonate converted to sodium hydroxide. It has been determined that the rate constant for reaction (5) increased by a factor of 3 as the operating temperature was raised from 353 to 393K. (Dotson B. E. and Krishnagopalan A., Causticizing Reaction Kinetics, *Tappi Proceedings* 1990 Pulping Conference, 234-244 (1990)). The rate constant dropped when the feed solution contained sodium hydroxide. The experimental causticizing efficiency for pure sodium carbonate and a mixture of sodium hydroxide and sodium carbonate were ~94% and ~85%, respectively. The rate constant for the causticization is driven by the concentration of free Ca ions in solution. Highly alkaline solutions will limit the availability of dissolved $Ca^{++}$ at any time and consequently reduce the rate of conversion. Elevated temperatures and active stirring reduce diffusional resistance and thus will increase the rate of reactions.

The concentrations of all the calcium species have been found to remain essentially constant throughout the reactions due to their low solubility, thus suggesting that the efficiency and rate constants may change if insufficient calcium is present. This occurrence has been prevented by using a 10% stoichiometric excess of lime. However, such an excess results in solid calcium hydroxide being entrained with the filtrate, which can produce higher energy consumption in the lime kiln due to the dehydration reaction.

The concentrations of the various species, both sodium and calcium, have a profound effect on the quality of the resultant filtrate. It has been observed that the solid phase of calcite is unstable in pure NaOH solution greater than 2 mol/l and easily converts to $Ca(OH)_2$ (Konno H. et al., *Powder Technology*, 123, 33-39 (2002)). These solids become stable in a 1 mol/l NaOH solution containing at least 0.02 mol/l $Na_2CO_3$. This latter solution mixture suggests that for an initial sorbent concentration of 1 mol/L, 96% of the hydroxide ions were converted to carbonate according to reaction (2). The presence of $Na_2CO_3$ also reduces the solubility of calcite. The solubility of $Ca(OH)_2$ is strongly dependent on the NaOH concentration and drops by a factor 4, to $5 \times 10^{-4}$ mol/l as the NaOH increases from 0 to 0.5 mol/l. Observations of the concentrations of $Ca^{2+}$ and NaOH during the reaction have shown that the $Ca^{2+}$ concentration dropped and the NaOH concentration increased as the reaction progressed. The initial $Ca^{2+}$ concentration was $1 \times 10^{-3}$ mol/l. It was also noted that the $Ca(OH)_2$ super-saturation ratio is the driving force for nucleation. In effect, these processes balance the solubility of calcium hydroxide against the solubility of calcium carbonate. The values for the dissociation constants are available in the literature (Snoeyink V. L. and Jenkins D., *Water Chemistry*, p. 295, John Wiley and Sons, New York (1980)).

$$[Ca^{++}][OH^-]^2 < K_{OH} = 10^{-1.49} \, mol^3/l \quad (8)$$

$$[Ca^{++}][CO_3^{2-}] < K_{CO3} = 10^{-3.22} \, mol^2/l \quad (9)$$

Given that the calcium concentration is the same in both (8) and (9), the carbonate concentration is solved as follows:

$$[CO_3^{2-}] = (K_{CO3}/K_{OH}) \times [OH^-]^2 \quad (10)$$

Assuming a 1 molar sodium solution, the effect of calcium on the charge balance can be neglected, and the sodium concentration must therefore balance all the negative ions. If causticizing efficiency ($\epsilon$) is defined as the ratio of hydroxide ions over sodium ions, the following relationship is obtained:

$$\varepsilon = \left(2 \frac{K_{CO3}}{K_{OH}}[OH^-] + 1\right)^{-1} \quad (11)$$

Thus, the stable solution suggested above (Konno et al.) would contain approximately 1 mol/l hydroxide ions, suggesting a theoretical causticizing efficiency of 96%, which is slightly higher than the experimental value that has been obtained (Dotson B. E. and Krishnagopalan A., *Tappi Proceedings* 1990 *Pulping Conference*, 234-244 (1990)). The difference is likely due to the omission of ionic activity in the calculations.

The experimental work discussed above provides a pathway for recovering sodium hydroxide from sodium carbonate. In the process, the carbon dioxide has been transferred into a solid form of calcium carbonate, which can be readily removed from the liquid. After washing and drying, it can be thermally decomposed. The causticization takes place in an emulsion of calcium hydroxide.

Calcination of Limestone: The final stage of the air extraction process is the recycling of the calcite precipitate. This is accomplished through thermal regeneration or calcination. Lime and limestone are among the oldest materials used, with the first recorded use in the Egyptian pyramids. There are three essential factors in the kinetics of dissociation: the dissociation temperature, the duration of calcination, and the $CO_2$ in the surrounding atmosphere. The reaction is shown below:

$$CaCO_{3(s)} \rightarrow CaO_{(s)} + CO_{2(g)}; \, \Delta H^\circ = +179.2 \, kJ/mol \quad (12)$$

The first quantification of the results of thermal decomposition involved a decomposition temperature of 1171K in a 100% $CO_2$ atmosphere at atmospheric pressure (Johnston J., *J. Am. Chem. Soc.*, 32, p. 938 (1910)). Current practices use lime kilns to dissociate the calcite; these kilns vary greatly in their performance. A very important performance metric for air extraction is the thermal efficiency, which is the product of the theoretical heat requirement and the available oxide content divided by the total heat requirement. The thermal efficiency refers to the proximity to the theoretical minimum heat requirement as defined by reaction (12), available lime refers to the amount of inert material present, in this case 7%. This translates into a total heat requirement of 3.03 MMBtu per ton of lime, or 4.5 GJ per tonne of $CO_2$. The thermodynamic minimum heat requirement of 4.1 GJ/tonne $CO_2$ can be calculated from the enthalpy value in reaction (12). The potential cost of air extraction will be dominated by reaction (12); any improvement regarding the above-mentioned kinetic factors (sorbents, causticization and calcination) will directly affect the cost of the project. A lower dissociation temperature will require less heat input, as will a shorter duration of calcination and a lower $CO_2$ content in the surroundings.

Air Extraction as Carbon Capture: This example relates to the capture of $CO_2$ directly from the atmosphere in a cost effective manner. As such, a brief comparison with the industry standards provides a benchmark for future work. Sterically hindered amines (SHA) and MEA are considered to be potential $CO_2$ capture technologies. They are regenerated using steam and their thermal energy requirements are 700 and 900 kcal/kg $CO_2$ for KS-2 and MEA, respectively. These values can be converted to 2.9 and 3.8 GJ/tonne $CO_2$. In one instance 90% of the $CO_2$ generated by the power plants was captured (Mimura T. et al., Development of energy saving technology for flue gas carbon dioxide recovery in power plant by chemical absorption method and steam system, *Energy Convers. Mgmt.*, 38, S57-62 (1997)); thus, the remainder has to be mitigated by other means. An economic analysis of $CO_2$ capture using MEA obtained a cost of $50 per tonne of $CO_2$ avoided. The durability of the sorbent is also an important cost factor.

The air extraction process encompasses hydrating or slaking the resulting lime. Generally lime is regenerated in the hydration process, thus a great reduction in capture efficiency from one cycle to the next is not expected. The process of hydration is believed to proceed via the migration of water into the pores of the lime particle. The hydration reaction, shown below, then takes place.

$$CaO_{(s)} + H_2O_{(l)} \rightarrow Ca(OH)_{2(s)} \Delta H^\circ = -64.5 \, kJ/mol \quad (13)$$

The hydration causes both expansion and the liberation of heat, which, in turn, causes the particle to split, exposing fresh surfaces and thereby reducing the effects of sintering. The inclusion of this reaction in the carbonation process will likely alter the performance and durability of the lime cycle, as will the lower temperatures of reaction. Slaked lime undergoes dehydration at temperatures above ~700K under ambient conditions. This defines the range of possible operating temperatures for the hydration process. Hydration is highly exothermic and can provide useful heat energy if it is performed efficiently at high temperatures.

The feasibility of air extraction will depend on the overall cost compared with alternative removal technologies. The cost per unit removal will further depend on the energy requirements, the durability of the sorbents, and costs external to the process. These external costs could include excessive water losses from the wet scrubbing. As this part of the process will be in contact with the open atmosphere, evaporation can be expected. This can be minimized by adjusting the sorbent concentration, which varies the vapor pressure until it matches that of the ambient air. The thermophysical properties of sodium hydroxide solution are known for a wide range of concentrations. The calcination reaction is likely the most energy intensive for the stated process. This highlights the need for efficient heat management within the system. Additionally, any significant lime degradation will rapidly raise costs and $CO_2$ management issues. Lime make up will have to be generated through the calcination process, thereby releasing $CO_2$. This additional $CO_2$ will raise the cost of the process either through lowering the net amount avoided or increasing the total amount sequestered.

Although the air contactors in the systems described herein can be much larger than the equivalent contact surfaces in a flue stack involving MEA, their contribution to the total cost may be very small. The recovery MEA sorbents require similar amounts of energy; in contrast, in the present procedures and systems, because the air is clean and hydroxides are not subject to oxidative losses, the make-up costs are low in a hydroxide system. Accompanying the air extraction of $CO_2$ is the efficient management of heat generation. The processes of this invention will maximize $CO_2$ capture while minimizing energy consumption.

EXAMPLE 2

A second example of a $CO_2$ capture process and system of the present invention is presented herein below. As described, the process and system involve the formation of sodium carbonate from sodium hydroxide and $CO_2$ from the air and the conversion of calcium hydroxide into calcium carbonate. The calcium hydroxide is recovered by calcining the limestone precipitate and then slaking it with water. Individual reactions related to the process and system, along with free energy or enthalpy values, are presented below; thermodynamic values are based on those as conventionally known in the pertinent art.

(1) $2NaOH+CO_2 \rightarrow Na_2CO_3+H_2O$; $\Delta H°=-171$ kJ/mol
(2) $Na_2CO_3+Ca(OH)_2 \rightarrow 2NaOH+CaCO_3$; $\Delta H°=57.1$ kJ/mol
(3) $CaCO_3 \rightarrow CaO+CO_2$; $\Delta H°=179.2$ kJ/mol
(4) $CaO+H_2O \rightarrow Ca(OH)_2$; $\Delta H°=-64.5$ kJ/mol
(5) $CH_4+2O_2 \rightarrow CO_2+2H_2O$; $\Delta H°=-890.5$ kJ/mol
(6) $H_2O_{(l)} \rightarrow H_2O_{(g)}$; $\Delta H_{vap}=41$ kJ/mol@373K, 0.1 Mpa In the system, sodium hydroxide, a caustic soda, is used as a sorbent. An aqueous solution can drip over internal surfaces in the filter system and thus allow for the capture of $CO_2$ from the air that passes through the system. Once the sorbent solution has reached the bottom of the system, it is either re-circulated or removed from the system for recycling. The purpose of a recycling plant is to strip the $CO_2$ from the spent sorbent and return fresh sorbent to the capture device. After the $CO_2$ has been stripped, it can be compressed and sent to a disposal site.

Overall Energy Balance:

In considering this system in terms of its energy balance, it can be compared with the basic reaction of forming carbon dioxide:

$C+O_2 \rightarrow CO_2$; $\Delta G°=-394.4$ kJ/mol or 9 GJ/tonne

The heat of this reaction is given per tonne (metric ton) of $CO_2$. The combustion processes that lead to the production of $CO_2$ typically generate more heat, since nearly all of these processes involve not only the oxidation of carbon, but to a smaller or larger extent the oxidation of hydrogen. Heat of combustion values for carbonaceous fuels range from about 500 kJ/mole of C for coal to 890 kJ per mole of carbon for natural gas (or 11.4 GJ/tonne of $CO_2$ for coal and 20.2 GJ/tonne of $CO_2$ for methane).

The regeneration of sodium hydroxide from sodium carbonate requires an input of energy. The primary chemical reaction in this process is the thermal decomposition of calcium carbonate, reaction (3). The enthalpy of reaction (3) is 179.2 kJ/mol or 4.1 GJ/tonne of carbon dioxide. This is the theoretical minimum energy penalty required to recycle the sorbent. It would be equally possible to express numbers in terms of tonnes of limestone or tonnes of lime. For every tonne of carbon dioxide that is freed from the sorbent, 2.3 tonnes of limestone enter the calcination process and 1.3 tonnes of lime leave the kiln. The value of 4.1 GJ/tonne of carbon dioxide is approximately 45% of the free energy released during the combustion of pure carbon. For natural gas this number would drop to 21%.

A method involving sodium hydroxide with lime washing as a viable solution to air capture provides a base system in which to identify and estimate cost. The viability of the sorbent recovery process will be judged on the net carbon production and the cost per tonne of carbon dioxide. In this Example, a preliminary evaluation has been performed in which various assumptions for losses and parasitic energy requirements were made. For example, it would be advantageous to have the pumping requirements met through renewable sources. Although a conventional calciner system is not ideal for calcining calcium carbonate in an air capture system due to the large amount of carbon dioxide that would be emitted to the atmosphere, several different approaches can obtain heat without carbon dioxide emissions. This Example embraces a membrane process that uses a mixed conductor membrane (MCM) to keep unused air separate from the combustion products. The advantage to this system is that the combustion occurs in an $O_2/CO_2$ environment, thereby producing a pure stream of $CO_2$ rather than a mixture with $N_2$ and impurities. In principle, transporting oxygen across a membrane in the present system is analogous to the solid oxide fuel cell (SOFC). However, a solid oxide based membrane system (SOMS) is expected to be substantially less expensive than a solid oxide fuel cell, which uses similar types of membranes as electrolytes. Fuel cells, in contrast to membrane separators, must provide charge electrodes on the surfaces of these devices in order to carry the return current. In the membrane separators, the electronic back current is in effect short circuiting the cell.

Without wishing to be bound by theory, in a SOMS system as described herein, the economic data for fuel cells will be used in determining a cost estimate. If treated as simple heat generators, these fuel cells could reach efficiencies of 80-85%; waste heat will be very valuable in this process. A commercially available product is the PC25™ system manufactured by International Fuel Cells, LLC. This is a 200 kW fuel cell system that consumes 2100 cft/hr or 86 lbs/hr (39 kg/hr) of natural gas. The rated efficiency is 87% with 37% being electrical and 50% being thermal. The estimated installed cost is approximately $4500/kW with a start up cost of $15,000. Federal and state funding may be available and could amount to $10001 kW15. These specifications are used for the calculations as the first generation SOFC's are currently unavailable and the DOE's performance target is for second generation SOFC's. The most important difference with the commercial PC25™ is that the MCM or SOFC would operate at temperatures in the 1200-1300K range, which is suitable for calcinations and better suited for heat exchange. Operating costs also depend greatly on the price of natural gas. Current NYMEX prices are approximately $5.501 million BTU 16, but more typical long time averages have been around $3.00 per million BTU.

The specifications listed above can be scaled down to a separation plant that has a thermal throughput of 100 kW, equal to a power plant of 80% percent efficiency that would provide electricity and waste heat. The plant would have the characteristics listed in the Table 1. The primary energy is based on the free energy of methane combustion shown in reaction (5) above in this Example.

TABLE 1

Specifications for Feasibility SOFC Power Station

| Specification | PC25TM | Feasibility SOFC |
|---|---|---|
| Rating | 200 kW | 100 kW |
| Methane Throughput | 39 kg/hr | 16 kg/hr'7 |
| Primary Energy | 17,140 GJ/yr | 7,020 GJ/yr |
| Installed Cost | $4,500/kW$_e$ | $4,500/kW$_e$ |
| Total Cost | $900,000 | $450,000 |

The size of the capture devices and their design will not impact the cost of recycling the sorbent because the volume of sorbent is independent of the partial pressure. Thus, it was appropriate to cost the system beginning at the downstream end, or the calciner. This is a reasonable procedure as the calciner station is the most expensive item. To maximize efficiency, it would be highly desirable to keep it operating continuously. In view of this, overall values for efficiency and availability, as well as parasitic energy requirements, have been assumed. Parasitic energy refers to the energy required to operate all of the equipment aside from the calciner. For these calculations, the overall efficiency was 80%, the availability was 99% and the parasitic requirement was 1%. Given those values, the total available energy for calcining is approximately 5,500 GJ/year. If the aforementioned 4.8 GJ/tonne for the calcining is assumed, an annual $CO_2$ extraction of 1,150 tonnes is arrived at. To check the assumption regarding the parasitic requirement, a simple calculation was performed to estimate the energy involved in lifting the sorbent material through an air contacter system. If it is assumed that the calcining occurs once per day and the sorbent solution concentration is 0.5 mol/l, then about 140 m$^3$ of solution is required to be circulated. An additional assumption of a 30 m pumping height produces a daily consumption of 0.04 GJ. Given a factor 2 for inefficiencies, an annual consumption of 30 GJ or 0.5% is obtained.

As expected, variations in the fuel and fuel cell costs will affect the cost per tonne. Table 2 contains a simple sensitivity analysis in which fuel and fuel cell costs are varied. The values in the table are cost per tonne extracted.

TABLE 2

Sensitivity Analysis

| Variables | | Cost per kW Installed | | |
|---|---|---|---|---|
| Fuel Cost | Overall Efficiency | $4500 | $1500 | $500 |
| $5.50/MMBtu | 80% | 68 | 46 | 39 |
| | 90% | 61 | 41 | 35 |
| $3.00/MMBtu | 80% | 52 | 30 | 23 |
| | 90% | 46 | 27 | 20 |

These values do not include the cost of sorbent replacement, roughly $2 per tonne of $CO_2$ extracted. This could be compared with the estimate costs using monoethanolamine (MEA) of approximately C37-50/tonne $, roughly $40-55 USD/tonne.

For sizing purposes, a daily material balance, in tonnes per day, has been prepared. The balance assumes that the incoming limestone contains 20% water, by volume. The fuel cell is assumed to absorb 50% of the oxygen from the airflow. There are no figures for the sodium hydroxide as it is recycled within the system. In order to maximize the energy efficiency of the process it will be necessary to minimize heat loss. This will require an energy inventory in order to determine the optimal use of the heat produced by the process. The lime will be reacted with water to form slaked lime, an exothermic process that occurs at 500° C. according to reaction (4).

For the initial calculations it is assumed that the input temperature is 300 K and the fuel cell temperature is 1200 K. The theoretical calcinations temperature for calcium carbonate is approximately 1173K. The values for sensible heat reflect the energy consumed or released by changing the temperature of the various material streams. These numbers were calculated by integrating formulae for the specific heat, CP, of each component. The specific heat data was obtained from the literature 8.20. Four reactions occur in the process; the evaporation of water from limestone, the calcination of limestone, the combustion of methane, the hydroxylation of calcium oxide. A daily material and energy balance is presented in Table 3. Energy consumed is positive and energy released is represented as a negative number, in parenthesis.

TABLE 3

Daily Material and Energy Balance

| | Mass | Temperature | | Energy | Sensible | Reaction |
|---|---|---|---|---|---|---|
| | (tonne) | Start | Finish | (kJ/mol) | (GJ) | (GJ) |
| Input | | | | | | |
| $CaCO_3$ (s) | 7.13 | 300 | 1200 | 169.79 | 12.10 | 12.77 |
| $H_2O$ (l) | 1.28 | 300 | 374 | 5.60 | 0.40 | 2.90 |
| $N_2$ (g) | 9.67 | 300 | 1200 | 3.72 | 1.28 | |
| $O_2$ (g) | 3.10 | 300 | 1200 | 38.30 | 3.30 | |
| $CH_4$ (g) | 0.38 | 300 | 1200 | 56.18 | 1.35 | (21.37) |
| Output | | | | | | |
| CaO (s) | 3.99 | 1200 | 800 | (21.27) | (1.52) | |
| $CO_2$ (g) | 4.19 | 1200 | 374 | (41.41) | (3.95) | |
| $N_2$ (g) | 9.67 | 1200 | 374 | (3.57) | (1.23) | |
| $O_2$ (g) | 1.55 | 1200 | 374 | (35.97) | (1.55) | |
| $H_2O$ (g) | 0.86 | 1200 | 374 | (32.08) | (1.54) | (1.95) |
| Calcium Hydroxide | | | | | | |
| $H_2O$ (g) | 1.28 | 374 | 800 | 15.53 | 1.11 | |
| $Ca(OH)_2$ | 5.27 | 800 | 374 | (45.28) | (3.23) | (0.53) |
| Total | | | | | 6.53 | (8.18) |
| Grand Total | | | | | | (1.65) |

The first observation to be made is that the entire process is a net heat producer. However, there are no explicit losses built into the calculations. If the absolute value of all the energy changes is summed, −72 GJ is obtained, meaning the system can tolerate loses of up to 2%. The input water is the water contained in the limestone plus the amount required for the hydroxylation of the lime.

Based on initial analyses, the cost of air contacting in an air contact system is expected to be small compared to the sorbent recycle system, which has been discussed herein above. The goal is to ensure the adequate supply of adsorbed carbon dioxide while keeping the infrastructure as small as possible. Given that the density of carbon dioxide is approximately 0.015 mol/m$^3$, an exposed area of ~20 m$^2$ with a wind speed of 6 m/s and an efficiency of 50% would be suitable for the system.

Despite the low concentration of carbon dioxide in air and system constraints, there is no fundamental reason why carbon capture from air is not possible. The system presented in this Example will generate extra carbon dioxide, but has been designed such that this carbon dioxide is not released to the environment. For the design presented in this Example, the cost depends on the availability of solid dense membranes through which oxygen ions can diffuse. It is also affected by the design of the fluidized bed. It is advantageous that the process is a net heat producer. It is also noteworthy that this design sequesters 1,100 tonnes of carbon dioxide a year.

All patent applications, published patent applications, issued and granted patents, texts, and literature references cited in this specification are hereby incorporated herein by reference in their entirety to more fully describe the state of the art to which the present invention pertains.

As various changes can be made in the above methods and compositions without departing from the scope and spirit of the invention as described, it is intended that all subject matter contained in the above description, shown in the accompanying drawings, or defined in the appended claims be interpreted as illustrative, and not in a limiting sense.

What is claimed is:

1. A method of extracting or sequestering carbon dioxide, comprising:
   (a) dissolving a magnesium bearing silicate in an aqueous acid to form an acidic solution;
   (b) increasing the pH of the solution of step (a) to precipitate one or more magnesium components;
   (c) carbonating the precipitated magnesium components from step (b) to bind carbon dioxide; and
   (d) recovering ammonia gas and acid by thermal decomposition or by electrodialysis.

2. The method according to claim 1, wherein the acid of step (a) is present in an amount at least 10% in excess of a stoichiometric amount for neutralizing magnesium in the magnesium bearing silicate.

3. The method according to claim 1, wherein the magnesium bearing silicate of step (a) comprises peridotite rock.

4. The method according to claim 1, wherein the magnesium bearing silicate of step (a) is selected from serpentine or olivine.

5. The method according to claim 1, wherein the aqueous acid of step (a) is selected from citric acid, acetic acid, chromic acid, sulfuric acid, orthophosphoric acid, oxalic acid, ammonium bisulfate, or a combination of two or more thereof.

6. The method according to claim 1, wherein the pH of the acidic solution is less than or equal to about pH 4.5.

7. The method according to claim 1, further comprising the step of neutralizing the acidic solution of step (a) with a neutralizing agent to precipitate iron and silicate prior to the precipitation of the one or more magnesium components.

8. The method according to claim 7, wherein the neutralizing step comprises a neutralizing agent selected from ammonia or magnesium hydroxide.

9. The method according to claim 7, wherein the pH of the neutralized solution is less than or equal to about pH 8.

10. The method according to claim 1, wherein increasing the pH in step (b) comprises an ammonia-containing reagent.

11. The method according to claim 1, wherein increasing the pH in step (b) comprises a reagent selected from NaOH, KOH, $NH_3$, $NH_4OH$, $NH_4HCO_3$, $(NH_4)_2CO_3$, $Na_2CO_3$, or a combination thereof.

12. The method according to claim 1, further comprising following step (c):
   (i) washing the precipitated magnesium component to remove residual salt; and
   (ii) exposing the precipitated and washed magnesium component to carbon dioxide at elevated temperature and pressure.

13. The method according to claim 12, wherein the elevated temperature comprises about 300° C. to 500° C. or above.

14. The method according to claim 12, wherein the elevated pressure comprises about 1 to about 50 atmospheres.

15. The method according to claim 12, wherein the precipitated magnesium component is magnesium hydroxide or magnesium oxide.

16. The method according to claim 1, wherein the one or more magnesium components of step (b) is $Mg(OH)_2$.

17. The method according to claim 1, wherein carbon dioxide is extracted or sequestered from air.

18. The method according to claim 1, wherein the one or more precipitated magnesium components is carbonated in step (c) in a gas solid reaction between magnesium components and carbon dioxide at elevated temperature.

19. The method according to claim 18, wherein the temperature is about 300° C. to less than about 900° C.

20. The method according to claim 18, wherein the temperature elevation is performed in an autoclave under pressure.

21. The method according to claim 20, wherein the pressure is about 1 to about 50 atmospheres or greater.

22. The method according to claim 1, comprising recovering ammonia gas and acid following step (c) by electrodialysis.

* * * * *